United States Patent [19]
Goldsmith et al.

[11] Patent Number: 5,491,800
[45] Date of Patent: Feb. 13, 1996

[54] OBJECT-ORIENTED REMOTE PROCEDURE CALL NETWORKING SYSTEM

[75] Inventors: Amy M. Goldsmith; David B. Goldsmith, both of Los Gatos; Christopher E. Pettus, San Francisco, all of Calif.

[73] Assignee: Taligent, Inc., Cupertino, Calif.

[21] Appl. No.: 169,795

[22] Filed: Dec. 20, 1993

[51] Int. Cl.$^6$ ............ G06F 15/173; G06F 15/177
[52] U.S. Cl. ............ 395/200.12; 364/284.4; 364/240.8; 364/244.3; 364/DIG. 1; 395/286
[58] Field of Search ............ 395/800, 200, 395/200.12, 286

[56] References Cited

U.S. PATENT DOCUMENTS

| | | | |
|---|---|---|---|
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | |
| 5,121,390 | 6/1992 | Farrell | 370/94.1 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,187,787 | 2/1993 | Skeen | 395/600 |
| 5,187,790 | 2/1993 | East | 395/725 |

OTHER PUBLICATIONS

12th Annual International Phoenix Conference On Computers And Communications, Mar. 23, 1993, Tempe, Arizona, US, pp. 495–501, K. Yuasa & P. D. Kumar Sinha, "Network Programming Support with Object–Oriented Paradigm".
Software Practice And Experience, vol. 21(1), Jan./1991, Chichester, GB, pp. 77–90, Levy & Tempero "Modules, Objects and Distributed Programming Issues in RPC and Remote Object Invocation".
*Experiences With the Amoeba Distributed Operating System*, by Tanenbaum, A. S., Comm of the ACM, Dec. 1990 vol. 33 No. 12 pp. 46–63.

*Primary Examiner*—Eric Coleman
*Attorney, Agent, or Firm*—Keith Stephens

[57] ABSTRACT

A client-server facility (CSF) interface and networking service facility (NSF) interface implement communication between application programs residing in client and server nodes of a distributed services network. The CSF interface includes remote procedure call (RPC) objects for invoking and responding to service requests at the nodes, and application programming interface (API) objects for transporting those requests between the nodes. However, the API objects only provide communication transports within a node. Accordingly, the API and RPC objects interact with dynamically-configurable protocol stacks within the NSF interfaces to complete the transport mechanism needed by an application program on the client node when accessing services on a remote server node.

46 Claims, 16 Drawing Sheets

OBJECT-ORIENTED REMOTE PROCEDURE CALL NETWORKING SYSTEM

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

1. Field of the Invention

This invention relates generally to improvements in distributed computer networks and, more specifically, to operating system software for efficiently implementing client-server systems in distributed service networks.

2. Background of the Invention

Computer hardware is becoming increasingly distributed and remote, resulting in networks of computers for solving problems in concert rather than as stand-alone systems. Although such distributed "services" networks generally facilitate problem-solving, they also increase the need for flexibility and functionality in software programs operating on the computers.

An example of a distributed services computer network is a "client-server" system 100 shown in FIG. 1. The system 100 comprises a collection of client nodes 102, e.g., workstations or personal computers, that communicate over a network 104 with various server nodes 106. The servers are typically computers having hardware and software elements that provide a sophisticated set of services, or operations, for use by the client nodes 102 to increase the efficiency of their own operations.

Several types of networks, including local area networks (LANs), may be employed in the client-server system 100. ALAN is a limited area network that typically consists of a transmission medium, such as a coaxial cable or twisted pair, for interconnecting the client and server nodes. Each node is connected to the transmission medium at an address which uniquely identifies the node and which is used to route data from one node to another.

Nodes coupled to the network typically communicate by exchanging discrete "packets" of data according to predefined "protocols". In this context a protocol consists of a set of rules defining how the nodes interact with each other. For example, communication in the client-server system 100 typically takes the form of packet exchanges, wherein the clients 102 send requests to the servers 112, which perform their services and communicate results back to the clients.

In order to reduce design complexity, most networks are organized as a series of hardware and software levels or "layers" within each node. These layers interact to format data for transfer between nodes that are communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the open systems interconnection (OSI) reference model, addresses the interconnection of systems that are "open" for communication with other systems. The proposed OSI model has seven layers which are termed, in ascending interfacing order, the "physical", "data link", "network", "transport", "session", "presentation" and "application" layers. These layers are arranged to form a protocol "stack" in each node of the network.

FIG. 2 illustrates a block schematic diagram of prior art protocol stacks 225 and 275 used to transmit data between a client node 200 and a server node 250, respectively. The protocol stacks are structured according to the international standards organization OSI seven-layer model, which also standardizes the functions of their constituent layers. Accordingly, only the protocol stack 225 of the client node will be described.

Broadly stated, the physical layer 214 of the OSI model transmits a raw data bit stream over a communication channel 220, while the data link layer 212 manipulates the bit stream and transforms it into a data stream that appears free .of transmission errors. This latter task is accomplished by dividing the transmitted data into data frames and transmitting the frames sequentially, accompanied with error correcting mechanisms for detecting or correcting errors. The network layer 210 routes data packets from a source node to a destination node by selecting one of many alternative paths through the physical network. The transport layer 208 accepts the data stream from the session layer 206, apportions it into smaller units (if necessary), passes the smaller units to the network layer 212, and provides appropriate mechanisms to ensure that all the units arrive correctly at the destination.

The session layer 206 establishes "sessions", i.e., connections, between software processes on the source and destination nodes, and transfers data over those connections in an orderly fashion. That is, a session not only allows ordinary data transport between the nodes, but it also provides enhanced services in some applications, such as dialogue control. The presentation layer 204 performs frequently-requested functions relating to the presentation of transmitted data, including encoding of data into standard formats, while the application layer 202 contains a variety of protocols that are commonly needed by programs executing on the nodes, such as remote file access.

As can be seen in FIG. 2, the protocol stacks 225 and 275 are physically connected through the communications channel 220 at the physical layers 214 and 64. Thus, data transmission over a client-server network consists of generating data messages in the application layer 202 of the client node 200 and passing the data messages down through the protocol stack 225, where they are formatted for delivery onto the channel 220 as bits of packets. Those packet bits are transmitted to the protocol stack 275 of the server 250, where they are passed up that „stack to the application layer 252. The generation and formation of data are performed by, inter alia, software programs executing on the nodes. These software programs may be generally categorized into two broad classes: application programs and operating systems. Operating systems are usually specific to a type of computer and consist of a collection of a utility procedures that enable the computer to perform basic operations, such as storing and retrieving information on primary and secondary storage devices, displaying information on an associated video display and, in some cases, performing network operations.

By itself, the operating system generally provides only very basic functions and must be accompanied by an "application" program. The application program interacts with the operating system to provide much higher level functionality and a direct interface with a user of the node. During interactions with the operating system, the application program typically invokes the utility procedures by issuing a series of parameter requests, via standard local procedure calls, to the operating system which then performs the request in accordance with the parameters. For example, the application program may "call" the operating system to store particular data on a computer disk memory or forward the data over the network.

As noted, a significant function of each layer in the OSI model is to provide services to the other layers. Two types of services offered by the layers are "connection-oriented" and "connectionless" network services. In a connection-oriented service, a source node establishes a connection with a destination node and, after sending a message, terminates the connection. The overhead associated with establishing the connection may be unattractive for nodes requiring efficient communication performance. For this latter case, a fully connectionless service is desirable where each transmitted packet carries the full address of its destination through the network.

A remote procedure call (RPC) establishes such a "connectionless session" between a client node and a server node for execution of a specific service. The RPC is typically embedded in software programs to make the remote call appear "local" to the nodes. Client-server communication thus takes the form of procedure calls and the network details are hidden from the application program by placing them in local procedures called "stub" procedures.

FIG. 3 illustrates a typical client-server system 300 wherein the client and server nodes are schematically represented by dotted boxes 305 and 355, respectively. Resident in each node are application programs, represented by boxes 302 and 352, and operating systems, represented by boxes 306 and 356. Interactions between the application programs and operating systems are illustrated schematically by the two-headed arrows 304 and 354. This dual program system is used on many types of computers ranging from mainframes to personal computers.

In order to provide RPC functions, the application programs interact (as shown schematically by arrows 308 and 318) with stub procedure software 310 and 360 by exchanging parameter requests. Each stub procedure, which is generally associated with the operating system, arranges, i.e., "flattens", the parameters into a predetermined message format according to the computer type. An RPC may transfer data or request a server to perform an operation; accordingly, appropriate stub procedures must be specifically designed in each node to invoke, or respond to, such actions.

Transport entities 314 and 364, i.e., the software within the transport layers of the protocol stacks, interact with the stub procedures (as shown schematically by arrows 312 and 362) to receive the messages, format them into packets and pass them over the network channel 315 via network adapters 316 and 366. These adapters incorporate the signal, electrical and mechanical characteristics, and interchange circuits, needed to interface with the network channel 315. The transport entities generally provide reliable, cost-effective data transport between the client and server, independent of the physical network channel.

To implement an RPC system, the application program 302 of the client 305 calls the stub procedure 310 by, inter alia, passing parameters in a manner similar to passing parameters for a conventional procedure call. The client stub procedure 310 flattens the parameters, which are passed to the transport entity 31 4 for transmission to the server 355 as a data packet. Since the RPC is a connectionless system, the transport entity typically attaches a header to the packet prior to forwarding it to the adapter 316 and onto the channel. When the packet arrives at the server, the adapter 366 passes it to transport entity 364 and onto the server stub procedure 360, which unflattens the parameters. The stub procedure 360 then calls the application program 352 and passes the parameters in a conventional manner.

After completing its work, the application program 352 "returns" in a manner that is conventional for local procedure calls, e.g., by returning a result. The stub procedure 360 flattens the result into a message and passes it to the transport entity 364, where a reply packet is formed and transferred to the client 305 over the channel 315. Upon receiving the reply packet, the transport entity 314 passes it to the client stub procedure 310 for unflattening. Finally, the stub procedure returns the reply parameters to the application program 302.

Clearly, the RPC system is a significant vehicle for providing distributed services in a client-server system. However, as the types of services available over networks proliferate, additional client-server systems are needed to ,distribute those services. This will require development of RPC software at both the client nodes, where the applications execute, and at the servers, where the services are provided. In addition, as different types of media are attached to the network, protocol stack software, including transport entities, must be developed to enable communication between the nodes. Previous attempts at implementing client-server systems have resulted in manual code-writing to provide common RPC and transport functions. In addition to being error-prone, the manually written code is typically duplicated at each node, thereby representing costly and inefficient use of software developer manpower.

Therefore, it is among the objects of the present invention to provide a flexible interface for efficiently implementing reliable client-server system communication in distributed service networks.

SUMMARY OF THE INVENTION

Briefly, the invention resides in a novel object-oriented client-server facility (CSF) interface and a networking service facility (NSF) interface for implementing communication between application programs residing in client and server nodes of a distributed services network. The CSF interface includes remote procedure call (RPC) objects for invoking and responding to service requests at the nodes, and application programming interface (API) objects for transporting those requests between the nodes. However, the API objects only provide communication transports within a node. Accordingly, the API and RPC objects interact with dynamically-configurable protocol stacks within the NSF interfaces to complete the transport mechanism needed by an application program on the client node when accessing services on a remote server node.

Specifically, the RPC objects comprise caller/dispatcher objects which, once instantiated, provide high-level, "client-server communication" protocol requests, and transport objects for selecting transport mechanisms, i.e., data streams, with which to forward those requests between a client and server. These transport mechanisms are provided the API objects, which include local/remote stream objects for creating the data streams.

Initially, the transport object is instantiated at the client node to configure data path between the application program and the novel NSF interface. A corresponding data path in a server node is configured when initializing that node. Client-server communication in the client node thus refers to communication between that node's application program and NSF interface using a data stream created by the remote stream object. Typically, the transport and remote stream objects are created in the process address space of the node, i.e., the "client". Here, the receiver of the transport object is a protocol translator residing in the session layer of a protocol stack in the system address space, i.e. the "server". The transport object creates the remote stream object which, in turn, creates a "data stream" path that ensures a consistent format for the presentation of data between the two address spaces.

Upon configuring the data paths, the caller object is instantiated at the client node to invoke an RPC service request by creating another transport object that creates yet another data stream. The transport object inserts the request into this data stream which is created by, e.g., the remote stream object. Because the data path is configured, client-server communication involves transferring the service request from a client node directly to a remote server node. At the latter node, the dispatcher object, and its associated methods, extract the remote request, execute the service and, if necessary, return a reply. Execution of a service is typically provided in connection with a resource task operating on the server. In some cases, many types of resources may be needed to execute various services; accordingly, sub-objects are provided at the server node that correspond with those various resource types. These sub-objects are "children" of the "parent" caller/dispatcher objects and include functions for their remote implementation.

The remote stream objects are generally used to establish synchronous send-receive-reply data stream transactions between the nodes. A "request/reply" transaction model utilizes remote sender stream and remote receiver stream objects to establish typical, short-term client-server communications at two nodes. If a client node requires a long-term association with a server, a partial remote operation service element (PROSE) model "binds" the nodes over multiple service requests. PROSE remote stream objects implement these long-term transactions by, inter alia, maintaining state information about the client nodes for the duration of the transactions.

For remote communication between client and server nodes, the remote stream objects interact with the dynamically-configurable protocol stacks located within the NSF interfaces of each node. These novel protocol stacks comprise a series of vertically-linked protocol layer objects that operate to complete the synchronous send-receive-reply data stream transaction between the client and server nodes. The protocol layer objects generally exist in shared libraries, and are used by client and server applications in their address spaces to access their protocol :stacks, which reside in system address space. An advantage of the invention is that client application programs may communicate directly with the CSF interface objects to automatically configure the client nodes for access to services located on remote server nodes without having to duplicate common RPC and transport software functions.

BRIEF DESCRIPTION OF THE DRAWINGS

The above and further advantages of the invention may be better understood by referring to the following description in conjunction with the accompanying drawings, in which.

DETAILED DESCRIPTION OF THE ILLUSTRATIVE EMBODIMENTS

Figure 1:
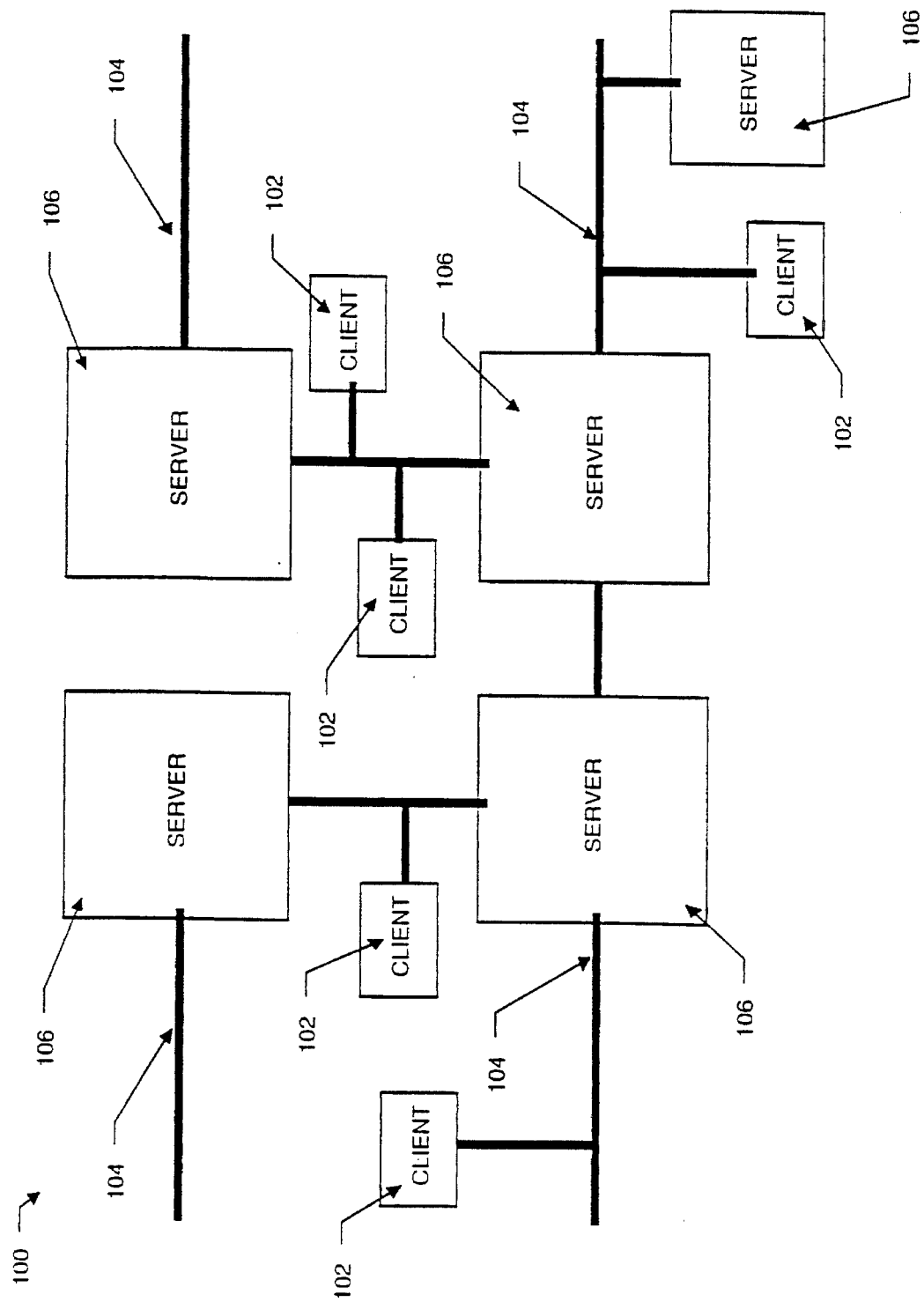
FIG. 1 is a block diagram of a computer network including a collection of nodes interconnected in a client-server system.
Figure 2:
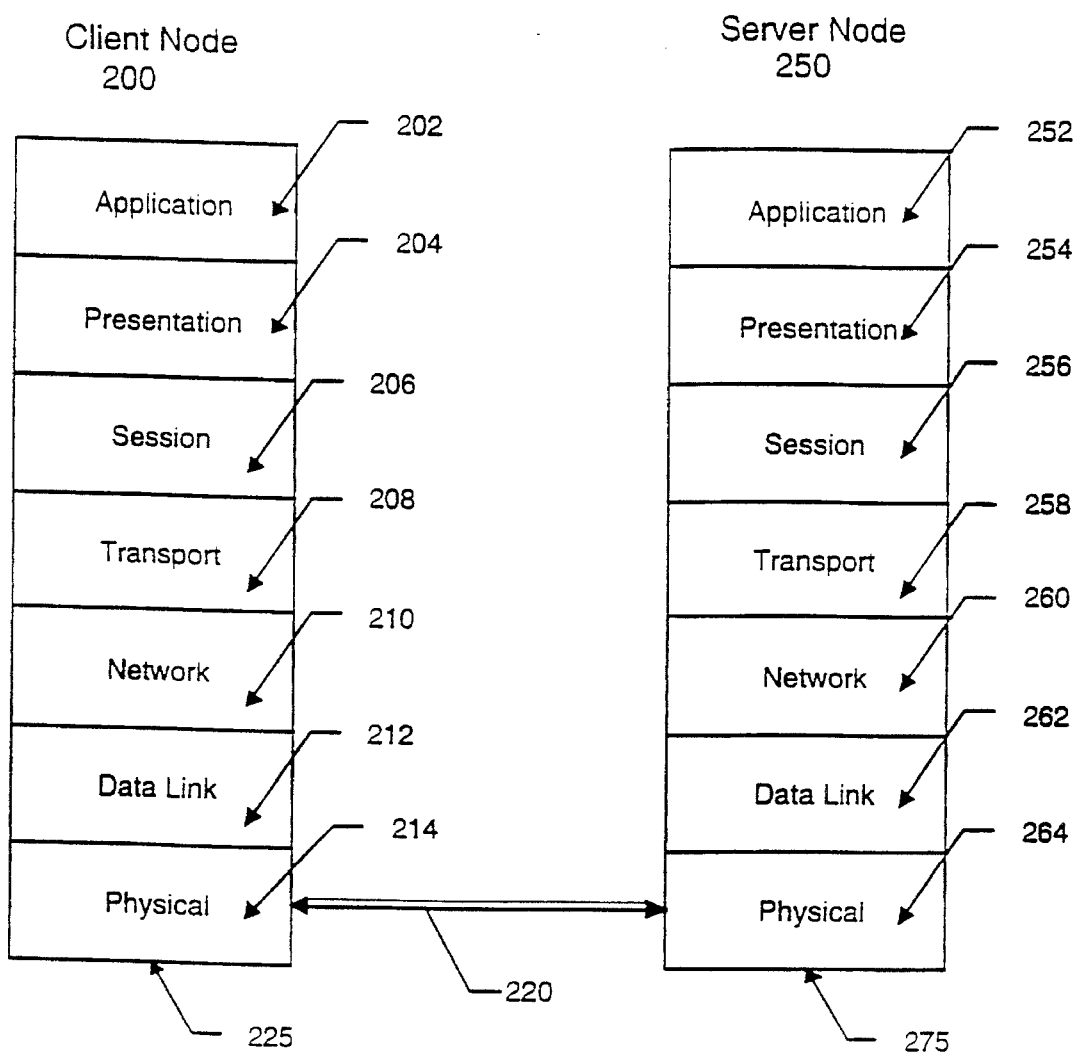
FIG. 2 is a schematic block diagram of prior art protocol stacks structured according to the international standards organization OSI seven-layer model and used to transmit data between a client node and a server node of the system shown in FIG. 1.
Figure 3:
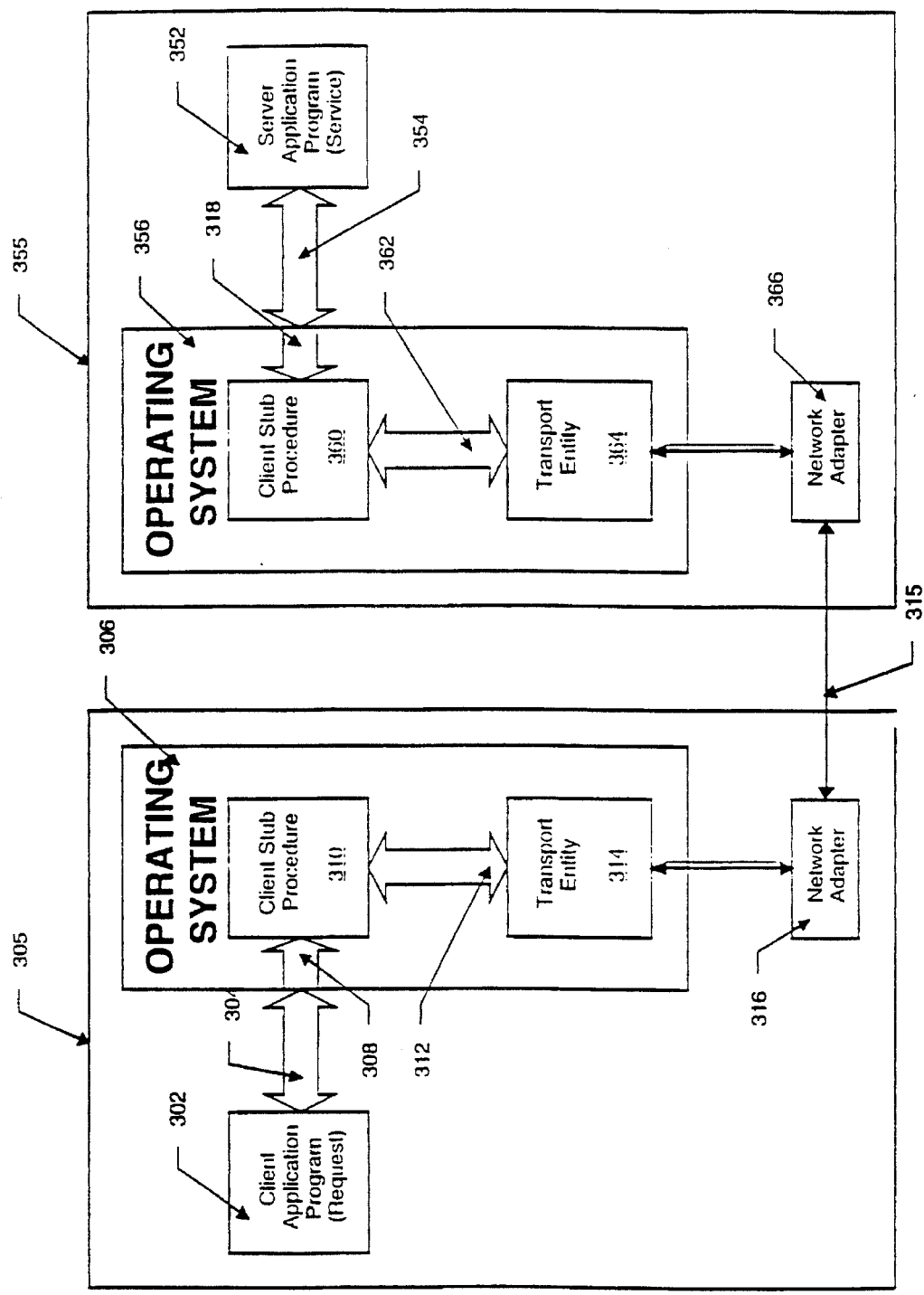
FIG. 3 is a schematic illustration of a typical client-server system showing the relationship between an operating system, an application program, a stub procedure and transport layer software of the prior art protocol stack for implementing a remote procedure call between the client and server nodes.
Figure 4:
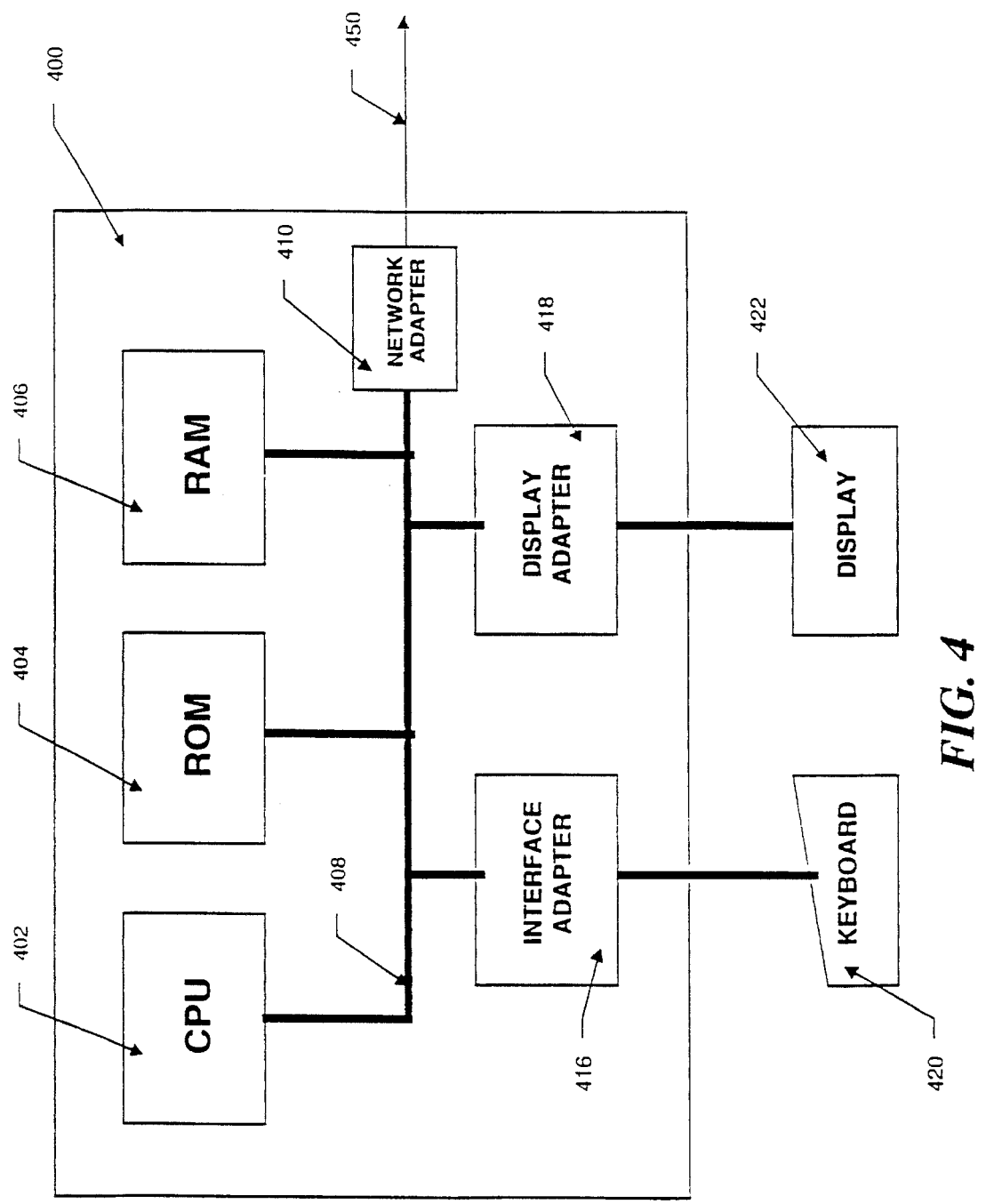
FIG. 4 is a schematic block diagram of a client node on which a novel, object-oriented client-server facility (CSF) interface may be used.

FIG. 4 illustrates a typical hardware configuration of a client node 400 in accordance with the present invention. The client 400 is controlled by a central processing unit 402, which may be a conventional microprocessor; a number of other units, all interconnected via a system bus 408, are provided to accomplish specific tasks. Although a particular client computer may only have some of the units illustrated in FIG. 4 or may have additional components not shown, most clients will include at least the units shown. Specifically, client 400 includes a random access memory (RAM) 406 for temporary storage of information, a read only memory (ROM) 404 for permanent storage of the computer's configuration and basic operating commands and a network adapter 410 for connecting the client to a transmission channel 450. A user interface adapter 416 is also provided for connecting input devices, such as a keyboard 420, and other known interface devices including mice, speakers and microphones to the bus 408. Visual output is provided by a display adapter 418 which connects the bus 408 to a display device 422 such as a video monitor.

Figure 5:
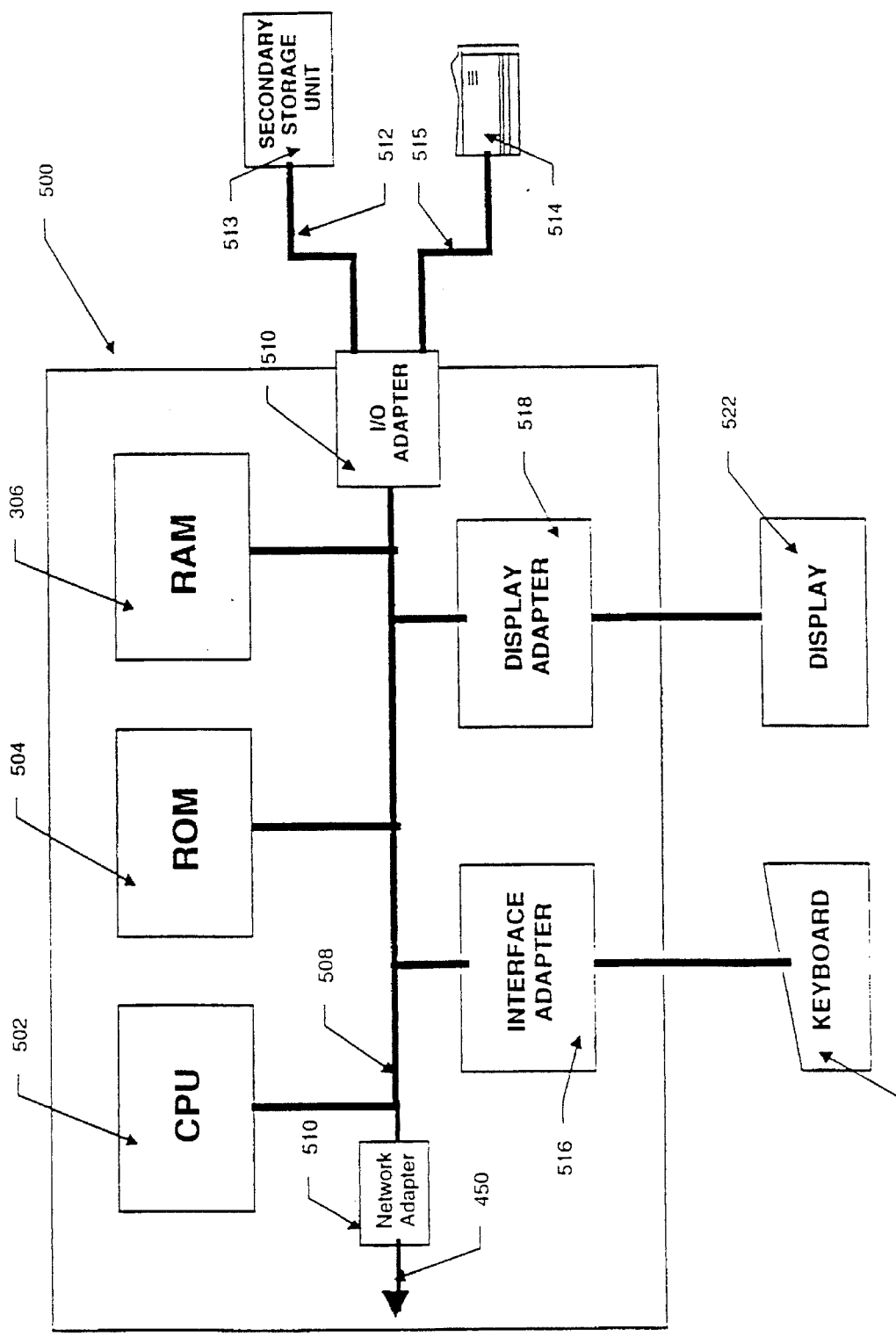
FIG. 5 is a schematic block diagram of a server node on which the novel CSF interface may be used.

FIG. 5 illustrates a typical hardware configuration of a server node 500 in accordance with the present invention. The server 500 has many of the same units as employed in the client 400, including a CPU 502, a ROM 504, a RAM 506, a network adapter 510, an interface adapter 516 and a display adapter 518, each of which are interconnected by a system bus 508. In addition, the server typically includes an input/output (I/O) adapter 550 for connecting peripheral devices such as a secondary storage unit 513 and a printer 514 to the bus 508, via cables 512 and 515, respectively.

The invention is preferably practiced in the context of client and server nodes such as IBMII PS/2 or Apple Macintosh computers. Moreover, the client and server have resident thereon, and are controlled and coordinated by, operating system software such as the Apple System/7 operating system. In a preferred embodiment, the invention is implemented in the C++ programming language using object-oriented programming techniques. C++ is a compiled language, that is, programs are written in a human-readable script and this script is then provided to another program, called a compiler, which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct an, actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls. In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a client-server facility (CSF) interface and a networking service facility (NSF) interface which could provide the foundation for automated remote procedure, call (RPC) facilities and transport entities to transfer service requests between client and server nodes. An application software developer who needed these capabilities would ordinarily have to write specific routines to provide them. To do this with a framework, the developer only needs to supply the characteristics and behavior of the finished output, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework, such as MacApp, can be leveraged not only at the application level for such things as text and user interfaces, but also at the system level, for services such as printing, graphics, multi-media, file systems, I/O, and, as described herein, networking.

Figure 6:
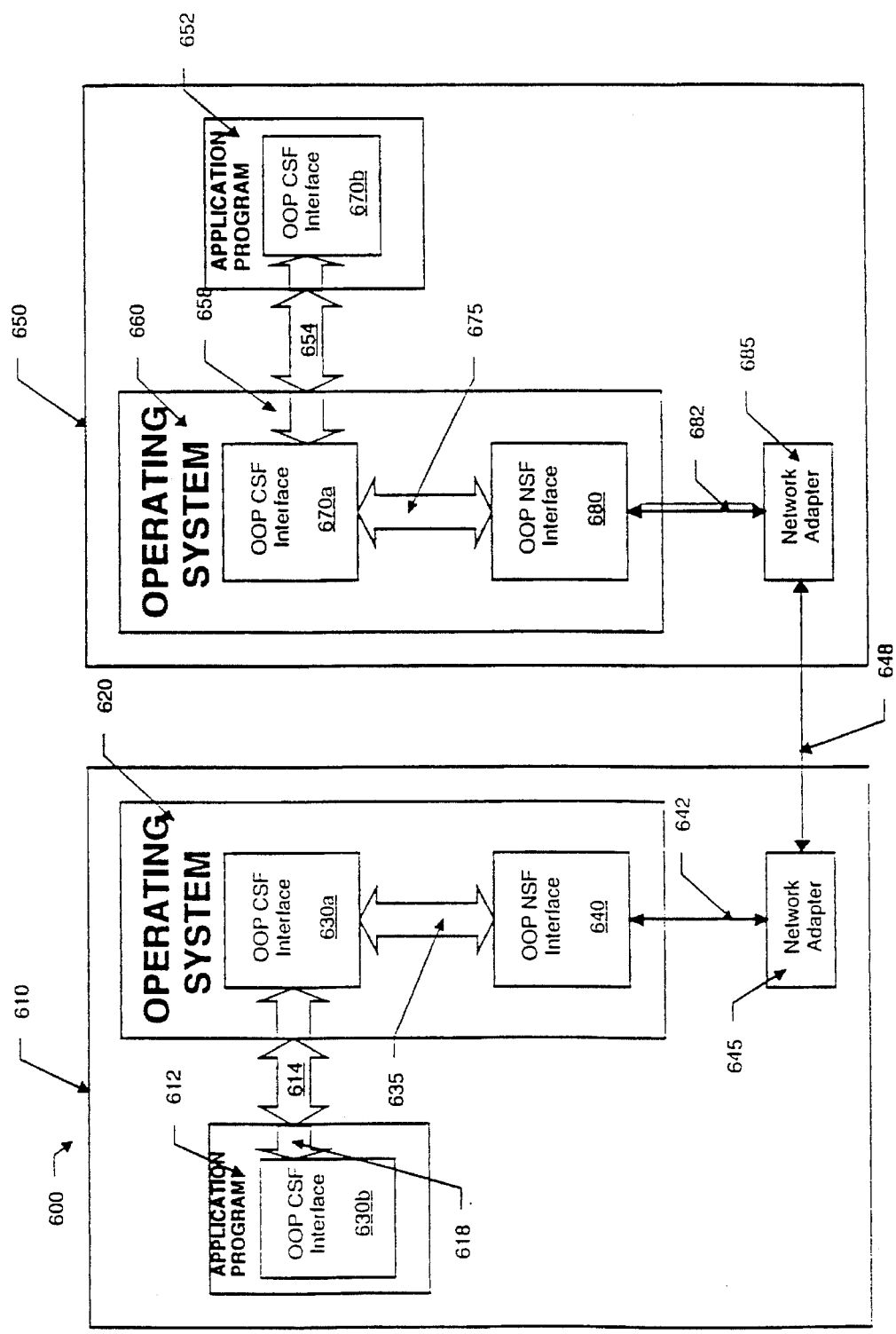
FIG. 6 is a schematic block diagram of client-server system in which the client and server nodes incorporate the object-oriented CSF interfaces and NSF interfaces in accordance with the present invention.

FIG. 6 is a schematic block diagram of a client-server system 800 in which the client node 610 and server node 650 incorporate CSF interfaces and NSF interfaces in accordance with the present invention. These interfaces are object-oriented programs that are accessed by application programs when invoking, transporting and responding to RPC service requests at the client and server nodes. Referring first to the client node 610, an application program 612 and an operating system 620 control and coordinate the operations of the node 610. Communication between the application program and operating system is indicated by arrow 614. However, instead of communicating directly with a stub procedure, application program 612 communicates with the operating system 620 at a higher level when requesting an RPC service. This latter interaction, shown schematically by dotted arrow 618, is accomplished by providing the object-oriented CSF interface 630. The CSF interface 630 is primarily incorporated within the operating system 620; however, a portion of that interface is created in the application program 612 when invoking RPC service requests and establishing a transport mechanism for communication with server node 650, as described further below.

The service requests are transferred from the CSF interface 630 to the object-oriented NSF interface 640 as indicated schematically by arrow 635. As will also be described in detail herein, the NSF interface formats the requests and otherwise completes the transport path between the client node 610 and server node 650. Thereafter, the requests are forwarded to network adapter 645, as indicated by arrow 642, and over communication channel 648 to the server node 650.

At the server 650, the remote RPC request is received at the network adapter 685 and passed to the NSF interface 680, as indicated by arrow 682. The NSF interface 680 reformats the request and forwards it to the CSF interface 670, as indicated by arrow 675. In response to the RPC, the CSF interface 670 directs the request to an application program 652 for execution of the service.

As with the client node 610, the application program 652 communicates directly with operating system 660 of the server node 650, as indicated by arrow 654. The CSF interface 670 resides in both the application program 652 and operating system 660, and interactions between those portions of the interface are shown schematically by dotted arrow 658.

As noted, the CSF interface and NSF interface are object-oriented programs that are shared by all applications executing on a node. These interfaces therefore reside primarily in the system address space, e.g., the operating system, of each node. When an RPC service request is invoked, that request is unique to the application program requesting the service. The application program thus creates a portion of the CSF interface within its own address space, i.e., within the process address space. In accordance with the invention, interaction between the application program and the "dual" CSF interface portions involves creating and manipulating "objects". This interaction is illustrated in greater detail in FIG. 7. It should be noted, however, that the stub procedure mechanism is also provided by the CSF interface, albeit not as an object.

Figure 7:
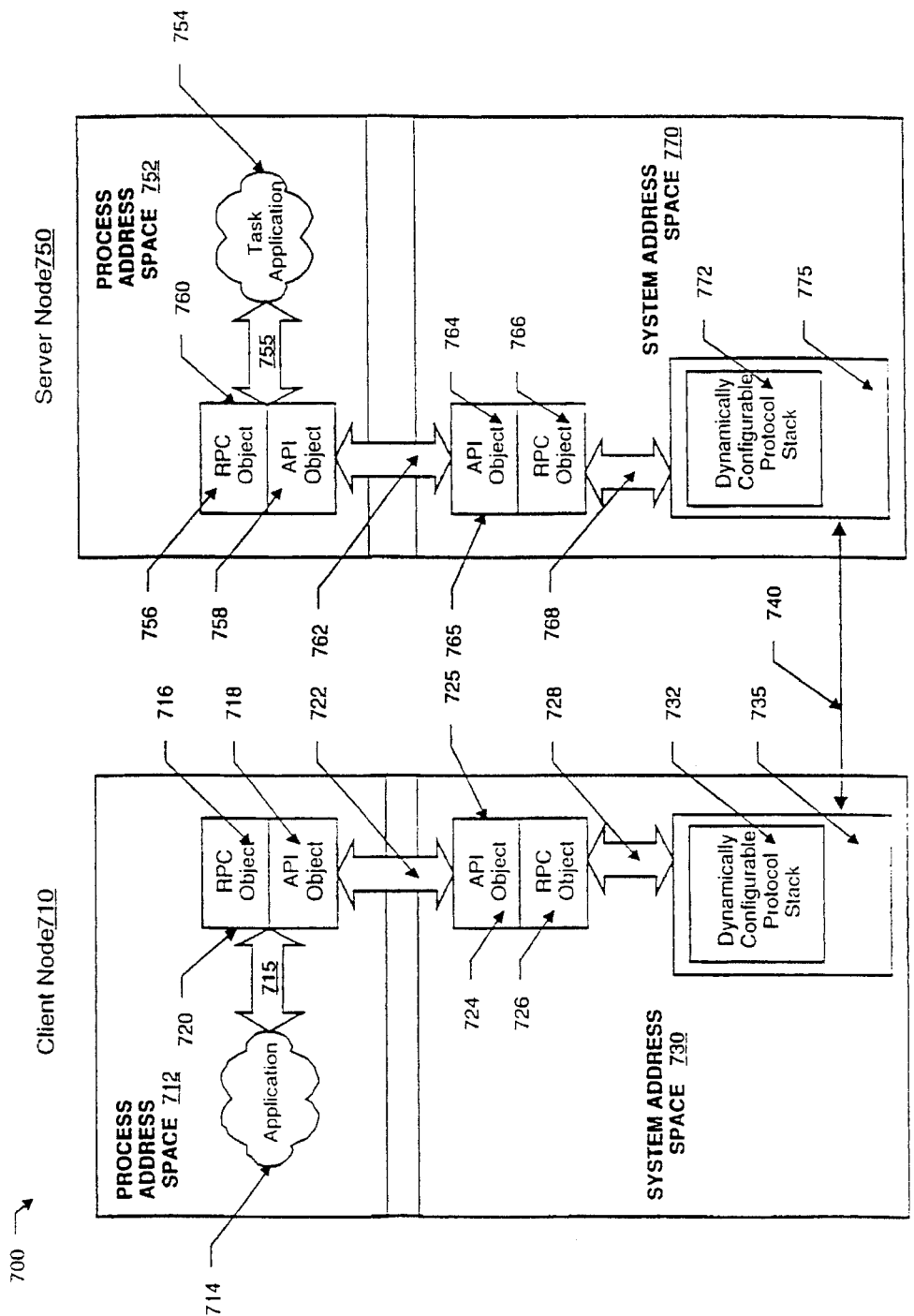
FIG. 7 is a schematic block diagram depicting remote procedure call (RPC) objects and application programming interface (API) objects of the CSF interfaces which may be referenced by application programs executing on client and server nodes.

The client-server system 700 depicted in FIG. 7 may be employed to configure the data paths of the client node 710 and server node 750, or to invoke, and respond to, RPC service requests, as described further herein in connection with FIGS. 12–15. In general, an application 714 executing oil the client node 710 communicates with the CSF interface 720 by creating an RPC object 716 and an application programming interface (API) object 718 within the process address space 712. Communication between the application 714 and the objects is shown schematically by arrow 715.

In one embodiment of the invention, the RPC object 716 may select an appropriate transport mechanism, i.e., a data stream, with which to ,establish the data path. The API object 71 8 then creates that data stream transport. In another embodiment, the RPC object 71 6 may also invoke an RPC service request, including the stub procedure mechanism, which is then placed on the data stream. In either case, the API object 718 only provides a data stream transport within the node 710 and, thus, must interact with the NSF interface 735 to complete the transport mechanism needed by the application 714 to access the server node 750.

Because the NSF interface 735 resides in a different (system) address space than the application 714, an API object 724 and RPC object 726 are created, preferably by the operating system 620 (FIG. 6) during initialization of the client node. These objects constitute the CSF interface 725 within the system address space 730 and are needed to complete the data stream transport. Specifically, the RPC objects 716 and 726 provide a high-level, client-server communication protocol requests, while the API objects 718 and 724 ensure a consistent format for the presentation of those requests between the two address spaces. Interaction between the API objects is indicated by arrow 722. The API object 724 and RPC object 726 then interact with the NSF interface 735, which configures the transport path to the communications channel 740. This interaction is indicated by arrow 728.

At the server node 750, a task application 754 communicates with the CSF interface 760 by creating an RPC object 756 and an API object 758 within its process address space 752. Communication between the task 754 and the objects is shown schematically by arrow 755. Since the NSF interface 775 resides in system address space 770, API object 764 and RPC object 766, i.e., the CSF interface 765, are required to complete the transport within the node 750. These objects are created by, e.g., the operating system 660, shown in FIG. 6. Interaction between the API objects is indicated by arrow 762. The API object 764 and RPC object 766 interact with the NSF interface 775, as indicated by arrow 768, to configure the data path to the communications channel 740.

It should be noted that configuration of the server data path is performed at initialization of that node and is generally static, i.e., the data path, including the protocol stack configuration, typically is not modified. This is primarily because the server node is configured to provide predetermined service or sets of services.

Network communication is between the client and server nodes is then completed by coupling the NSF interfaces 735 and 775 over the channel 740 so that the application 714 may communicate with task 754. Specifically, dynamically-configurable stacks 732 and 772, included within the NSF interfaces 735 and 775, respectively, are "coupled" over the channel to provide "peer-to-peer" communication between the nodes, as described below.

Interface and Dynamically-Configurable Protocol Stacks

The NSF interface generally comprises objects that exist in shared libraries, e.g., in system address space, and are used by client and server applications in their address spaces to access their protocol stacks, which also reside in system address space. As will be described further below, the NSF interface interacts with, inter alia, the API objects to provide a synchronous client/server transport service between remote nodes. This service is implemented using dynamically-configurable protocol stacks as a set of synchronous operations. These stacks may be configured to support a variety of networking architectures and network adapter devices.

It should be noted that the NSF interface is not in the same address space as the client and server applications that invoke, and respond to, remote service requests. Accordingly, each active client and server application has at least one shadow task in the NSF interface. Presentation of the request data is dealt with in process address space, specifically within the presentation layer of the dynamically-configurable protocol stack. The RPC objects, which invoke client-server protocol, are typically generated in the application layer of the novel protocol stack. The API transport objects are used to ensure consistent formats for the presentation of that request data between the address spaces.

Figure 8:
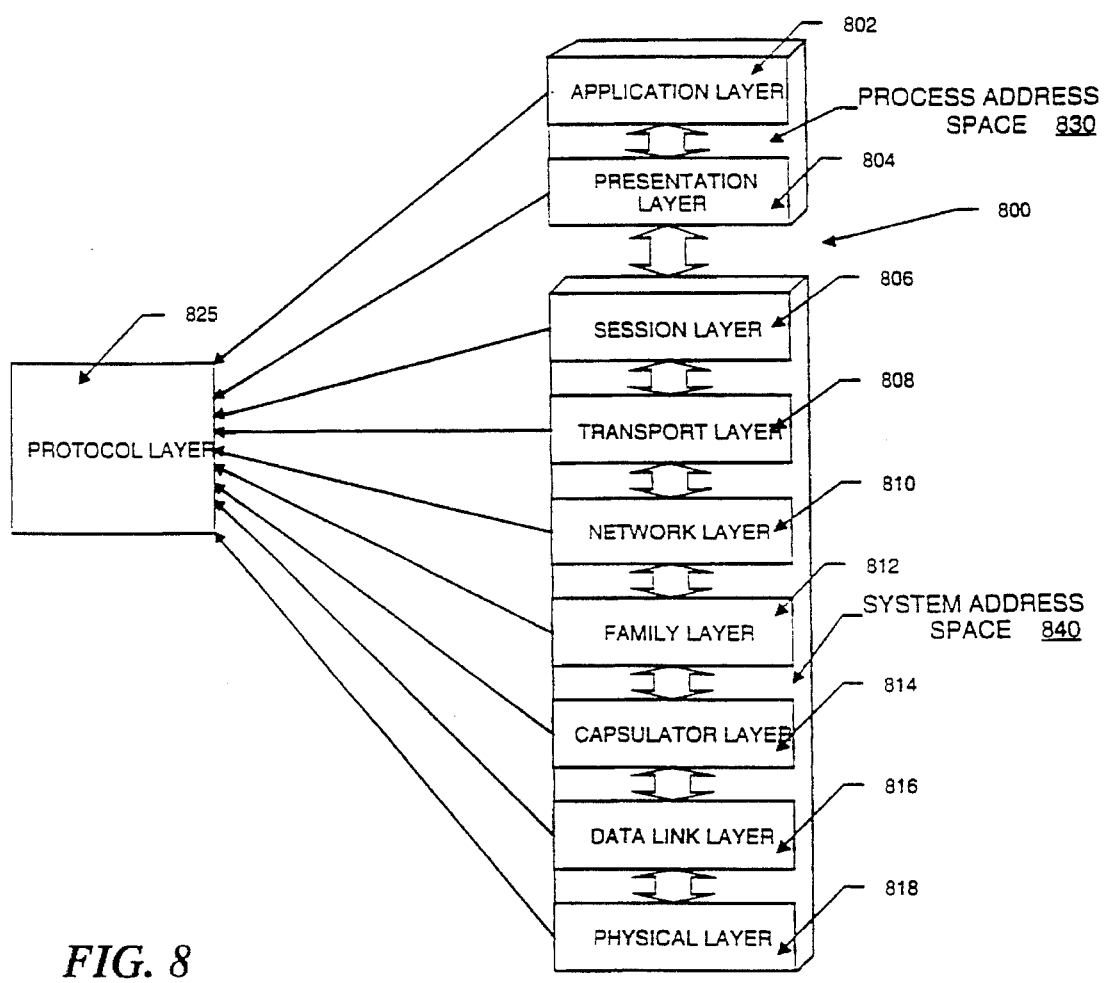
FIG. 8 is a schematic block diagram of a novel, dynamically-configurable protocol stack of the NSF interface.

FIG. 8 is a schematic block diagram of the novel, dynamically-configurable stack, designated 800. The stack 800 comprises a series of vertically-linked protocol layers that are nominally reminiscent of the OSI protocol layer model. Each layer of the protocol stack is preferably an object that descends from a single abstract base class, shown schematically at 825 as Protocol Layer, and is accessible by functions associated with that class, such as "get" the lower and upper protocol objects. These layers include "application", "presentation", "session", "transport", "network", "family", "capsulator", "data link" and "physical" layers. In general, the structures and functions of these layers are similar among client and server nodes.

Specifically, the application layer object 802 handles protocol and interface information for exchanging data, e.g., requests/replies data, with application programs operating on the nodes. The presentation layer object 804 addresses the presentation of the data transmitted from the application layer object, while the session layer object 806 is responsible for associating a transport service to the application. The transport layer object 808 formats the data into a packet for transmission over the network to a remote peer, i.e. another transport layer. This latter step is accomplished by acquiring network buffers (not shown) for coping the data into packets. The amount of data that may be copied into each packet varies depending on the protocols employed. Information relating to the protocols is contained in a transport header, which must be acquired by the transport prior to packetization. Once copied, the data is mutually encapsulated with the transport header information and passed to the network layer.

In accordance with the invention, the network layer object 810 represents a portion of a protocol architecture that contains state information relative to a particular instantiation of the protocol stack 800. The state information includes the network address of this object's peer, i.e., the network service access point (NSAP), and the type of higher level protocol supported by the stack. Specifically, the network layer object 810 encapsulates the data received from the transport layer with its own header. The information contained in the network header is typically the source and destination addresses of the request/reply. The encapsulated information is loaded into a buffer (not shown) and passed to the family layer object 812 for dispatch to the appropriate data link by, e.g., accessing the correct capsulator object.

The family layer object 812 represents non-replicated portions of the network layer object, such as routing information. Specifically, the family layer object represents the base of the protocol architecture and is responsible for selecting the correct data link object to deliver a packet.

The capsulator layer 814 includes a plurality of capsulation objects that contain information relating to the supported data link protocol and networking protocol architectures. These capsulators, or specialized shims, append medium access control (MAC) addressing information to outbound packets (encapsulation) and interpret that information on incoming packets (decapsulation). Specifically, the capsulator object encapsulates the packet with the proper data link header. The information needed to encapsulate the packet is retrieved the buffer; that information includes the destination address, which is in protocol specific form, and the data link, i.e., the source, address. The destination address is "mapped" to the particular data link format and passed to the data link layer.

The data link layer object 816 accepts framed bytes from the capsulator layer 814 and delivers them to the physical layer object 81 8 which transmits the data over the network. Specifically, the data link object queues the buffer for processing by an interrupt service routine (ISR). The ISR is a process that deals directly with hardware interrupts. Specifically, the ISR is responsible for moving the data to and from the network adapter device (see FIG. 6 at 645 and 685) and for controlling the actions of that device. When the data link object accesses the buffer, the packet is completely formatted and described by, e.g., a pointer and byte length.

Each layer typically expects the next lower layer to export a logically-sequential lower protocol. However, this is not always the case and, thus, a layer may not generally expect a specific adjacent layer. In these latter cases, arbitrary stacking of protocol layers may be achievable with the use of shims. Shims are special transformation objects that may be inserted between protocol layers to solve a variety of problems, such as mapping two unlikely layers together without perturbing the layers themselves or to provide additional functionality transparently between two existing layers.

Although the actual data communication occurs between the physical layers of two protocol stacks over a communications channel, each layer may be thought of as communicating with its "peer" which is a layer of one stack that is at the same level as a layer of a remote stack. For example, as can be seen in FIG. 8, the upper protocol layers 802 and 804 reside in the process address space 830 of a node. These layers, which are unique to each application in a node, communicate with respective upper protocol layers on a remote node. On the other hand, the lower protocol layers 806–818, which are shared by all applications and therefore reside in the system address space 840 of a node, communicate with corresponding lower protocol layers of a remote node.

As described herein, an outbound data request, e.g., a transmit or send request, is transferred from the application, "over" the transport and to the NSF, where it is serviced by the shadow task, or protocol translator operating in the session layer of the novel stack. In accordance with the invention, the direct client of the; protocol translator (session layer) is the API transport. The protocol translator generally associates request "on" the transport with an existing protocol stack and, thereafter, copies the data requests into a packet and delivers it to the lower layers of the novel protocol stack.

RPC Objects

Figure 9:
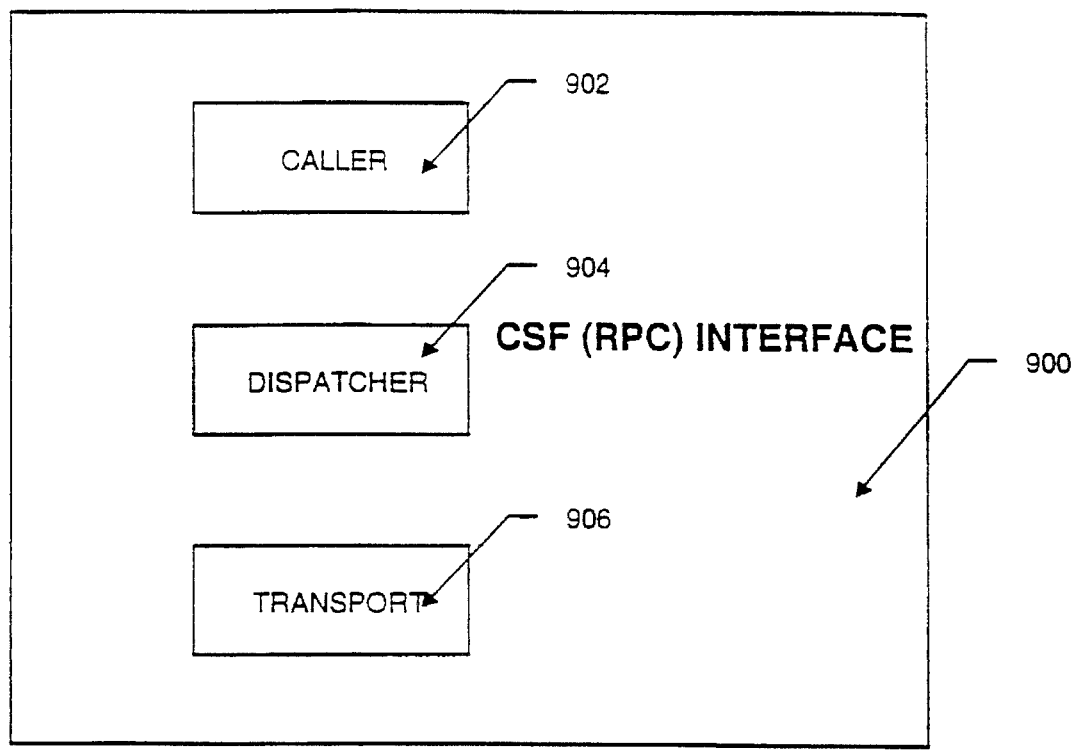
FIG. 9 is a schematic block diagram of the illustrative RPC objects used to interact with the CSF interface in accordance with the invention.

FIG. 9 is a schematic diagram of the RPC objects used by an application program to interact with the CSF interface, designated 900. These pre-defined objects are created by an application program or the operating system, depending upon the type of "client-server communication" required.

In accordance with the invention, the RPC objects comprise a caller object 902, a dispatcher object 904 and a transport object 906. Each of these objects comprises data and functions that operate on that data. Specifically, the caller object 902 provides high-level RPC protocol for calling "remote" requests that reside elsewhere in a corresponding dispatcher object 904. The dispatcher object 904 complements the caller object 902 by interpreting the functions being invoked by the .caller and thereafter dispatching to those functions. The transport object 906 isolates the caller/dispatcher protocol objects, and their corresponding data requests, to a specific transport mechanism. That is, the transport object handles requests issued by the caller object to and from the corresponding dispatcher object.

The caller object 902 and transport object 904 are constructed from their own classes, RemoteCaller and RemoteDispatcher, respectively. These classes implement an agreed upon remote request protocol that identifies a request issued by the "client" application and, at the "server", automatically dispatches to the appropriate class and function. The transport object 906 is also constructed from its own class, RemoteCallerTransport. This class defines characteristics of the transport mechanism including, inter aria, the argument and result streams, the method invoked by the caller to send a request and the behavior required for beginning and ending a request. It should be noted that the caller/dispatcher classes are constructed independent of the transport class to allow substitution of transports, as desired.

In accordance with the invention, sub-objects may be provided, typically at server nodes, for managing resource at those nodes. These sub-objects are "children" of the "parent" caller/dispatcher objects and include functions for their remote implementation. Specifically, the sub-objects have a property that both the data and protocol can be remote, thus allowing function calls via RPC requests. There need not be a protocol relation between a "parent" and "child" because their protocols are independent of one another. Moreover, at the client node, the parent and children protocol objects share a transport. At the server node, the parent "monitors" its child objects so that child requests may be mapped to correct child instances, and accordingly dispatched.

Exceptions arising during an RPC request are handled using the caller/dispatcher classes. That is, if the server raises an exception, it is returned in place of any results, and delivered to the client. If an exception is raised by the caller, it is handled by the caller. If an exception is raised while streaming results from the server to the client, it appears at the client when unflattening the results.

API Objects

Figure 10:
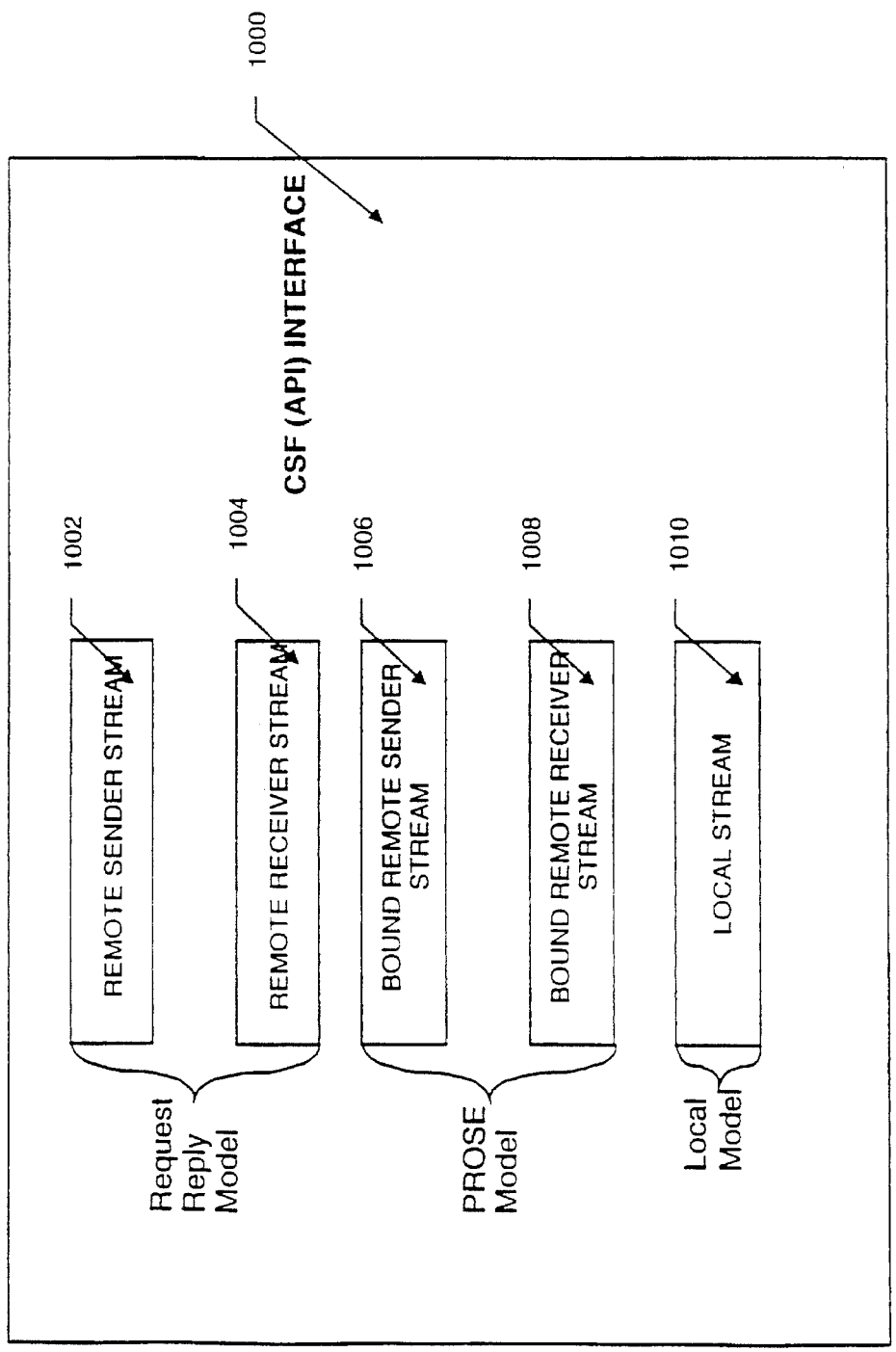
FIG. 10 is a schematic block diagram of the illustrative API objects used to interact with the CSF interface in accordance with the invention.

FIG. 10 is a schematic diagram of the API objects used by an application program to interact with the CSF interface, designated herein as 1000. Each of these objects comprises data and functions that operate on that data, and each may be created by an application program or the operating system, again depending upon the type of "client-server communication" employed.

Organizationally, the API objects may be apportioned into three distinct model groups: (i) "request/reply" model objects that are used for establishing typical (short-term) synchronous send-receive-reply data stream transactions between client and server nodes; (ii) partial remote operation service element (PROSE) model objects for "binding" those nodes over multiple (long-term association) service requests; and (iii) "local" model objects that are used for sending and receiving data requests within each node.

Referring to FIG. 10, a remote sender stream object 1002 and a remote receiver stream object 1004 of the CSF (API) interface 1000 are objects relating to the "request/reply" model. The PROSE model includes a bound remote sender stream object 1006 and a bound remote receiver stream object 1008, while the "local" model comprises solely a local stream object 1010, which is constructed from its own class. This latter model supports asynchronous transmission and reception of data, and supports full duplex communications.

Broadly stated, the "request/reply" model is employed in a situation where a server node receives requests from any number of client nodes. As noted, communications takes the form of synchronous send-reply transactions between client and server applications executing on those nodes. As an example, a client application sends a request to a server task application. The server application, upon receiving the request, processes it, computes a reply (if necessary) and returns the reply which is subsequently received by the client application. For this case, the remote sender stream object 1002 is used by the client application to send the request and receive the reply, while the remote receiver stream object 1004 is used by the server application to receive the request and send the reply.

The partial remote operation service element (PROSE) model generally provides request/reply transactions in situations where client applications require a long-term association with a server application. This association is typically commenced by a connection sequence and terminated by a disconnection sequence. During the association, each request received by the server application includes an identification indicating the "sending" client application. In addition, a state object may also be associated with each client. For transactions requiring PROSE objects, the bound remote sender stream object 1006 is used by the client application to establish the long-term association with the server application, and to send requests and receive replies. The bound remote receiver stream object 1008 is used by the server application to establish the association with a client application and to receive requests and send replies.

As noted, these API objects operate to provide a communications interface between applications residing in a single node or between two remote nodes. However, the API objects, by themselves, provide a communication transport, i.e., data stream, only within a node. To provide remote communications between two nodes, the API and RPC objects communicate with a protocol translator that operates in the session layer of the dynamically-configurable protocol stack in the NSF interface. This session layer translator interacts with both a communications model, e.g., "request/ reply", and protocol stack at the node. Moreover, the translator enables the "client" protocol stack to communicate with a server protocol stack over a network communications channel. In order to further understand the operations of these API objects, it may be useful to examine their construction together with the major function routines that comprise the behavior of the objects. In examining the objects, it is also useful to examine the classes that are used to construct the objects (as previously mentioned the classes serve as templates for the construction of objects). Thus, the relation of the classes and the functions inherent in each class can be used to predict the behavior of an object once it is constructed.

Figure 11:
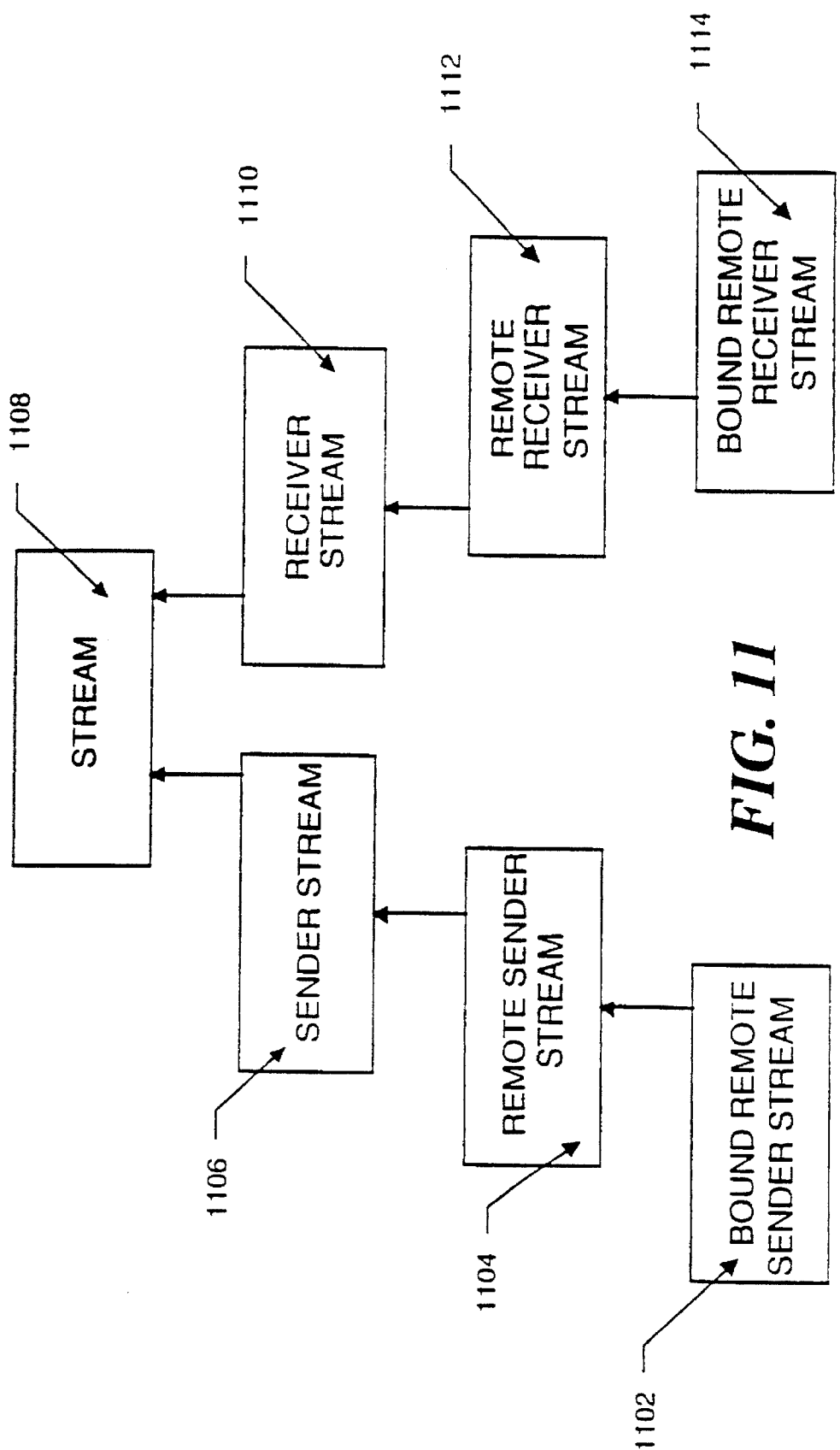
FIG. 11 is a simplified class hierarchy diagram illustrating the base, subclasses and associated classes involved in the construction of the API objects of FIG. 10.

FIG. 11 shows a simplified class hierarchy diagram for the API objects. The class (illustrated by box 1104) used to construct the remote sender stream object is a subclass of an abstract base class called Sender Stream 1006. The class Sender Stream is a subclass of Stream, shown as box 1108; accordingly, Sender Stream 1106 provides any streaming operators available in Stream, e.g., functions such as send, receive and reply, to objects of the Remote Sender Stream class 1104. Moreover, Sender Stream class 1004 defines the protocols that are internally used to implement its subclasses.

The class (illustrated by box 1112) used to construct the remote receiver stream object is a subclass of another abstract base class, Receiver Stream 1110. As another subclass of Stream 1108, Receiver Stream 1110 also provides the streaming operators of Stream, set forth above, to the remote receiver stream object, while defining the protocols used to implement the Remote Receiver Stream class 1112 and other subclasses.

The class (illustrated by box 1102) used to construct the bound remote sender lo stream object is a subclass of the Remote Sender Stream class 1104 and the class (illustrated by box 1114) used to construct the bound remote receiver stream object is a subclass of the Remote Receiver Stream class 1112.

Stack Configuration

Figure 12:
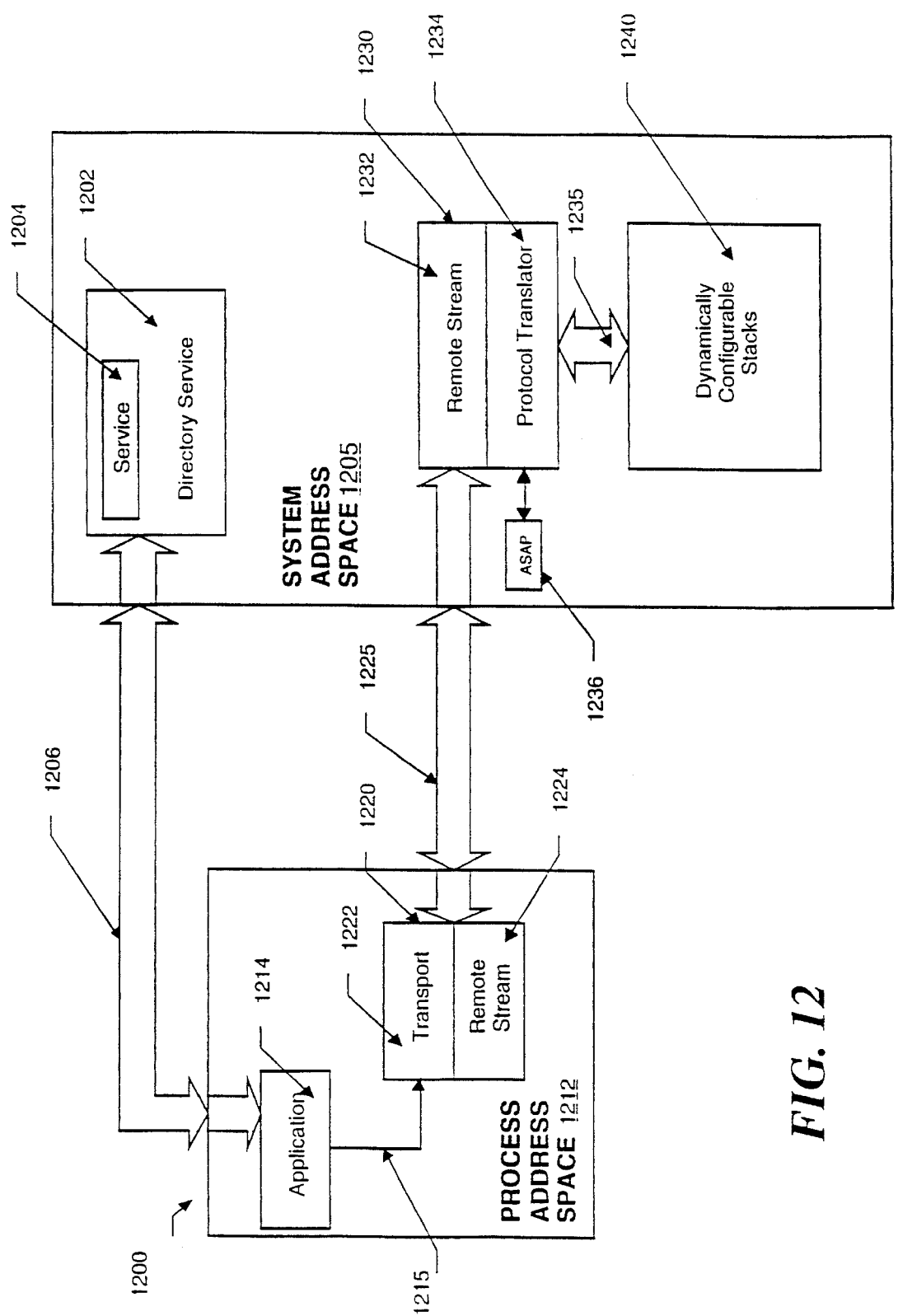
FIG. 12 is a schematic block diagram of a client node in which the object-oriented CSF interface and NSF interface are utilized to configure a data path prior to invoking an RPC service request.

FIG. 12 is a schematic block diagram of a client node 1200 in which the object-oriented CSF interface 1210 and NSF interface 1220 are utilized to configure a data path prior to invoking an RPC service request. A directory service 1202, located in system address space 1205, contains service objects 1204 that define the type of protocol stacks needed to access services available on the network and, therefore, defines the required data path. An application 1214 executes on the node 1200 and interacts with the CSF interface 1220 through a transport object 1222 and an remote stream object 1224, each of which resides in process address space 1212.

Communication between the application 1214 and the CSF interface objects is shown schematically by arrow 1215. In system address space 1205, the CSF interface 1230 comprises another remote stream object 1232 and a protocol translator object 1234, which preferably operates in the session layer of the dynamically-configurable protocol stack. Interaction between the remote stream objects is indicated by arrow 1225. The CSF interface 1230 interacts with the dynamically-configurable protocol stack 1240, as indicated by arrow 1235. In addition, the protocol translator 1234 interacts with a buffer 1236 to store and retrieve address information. Although the server node is not shown in FIG. 12, it should be noted that elements needed to configure a data path to respond to service requests is generally similar to those described above. Typically, task application programs provide resources for responding to the service requests.

Figure 13:
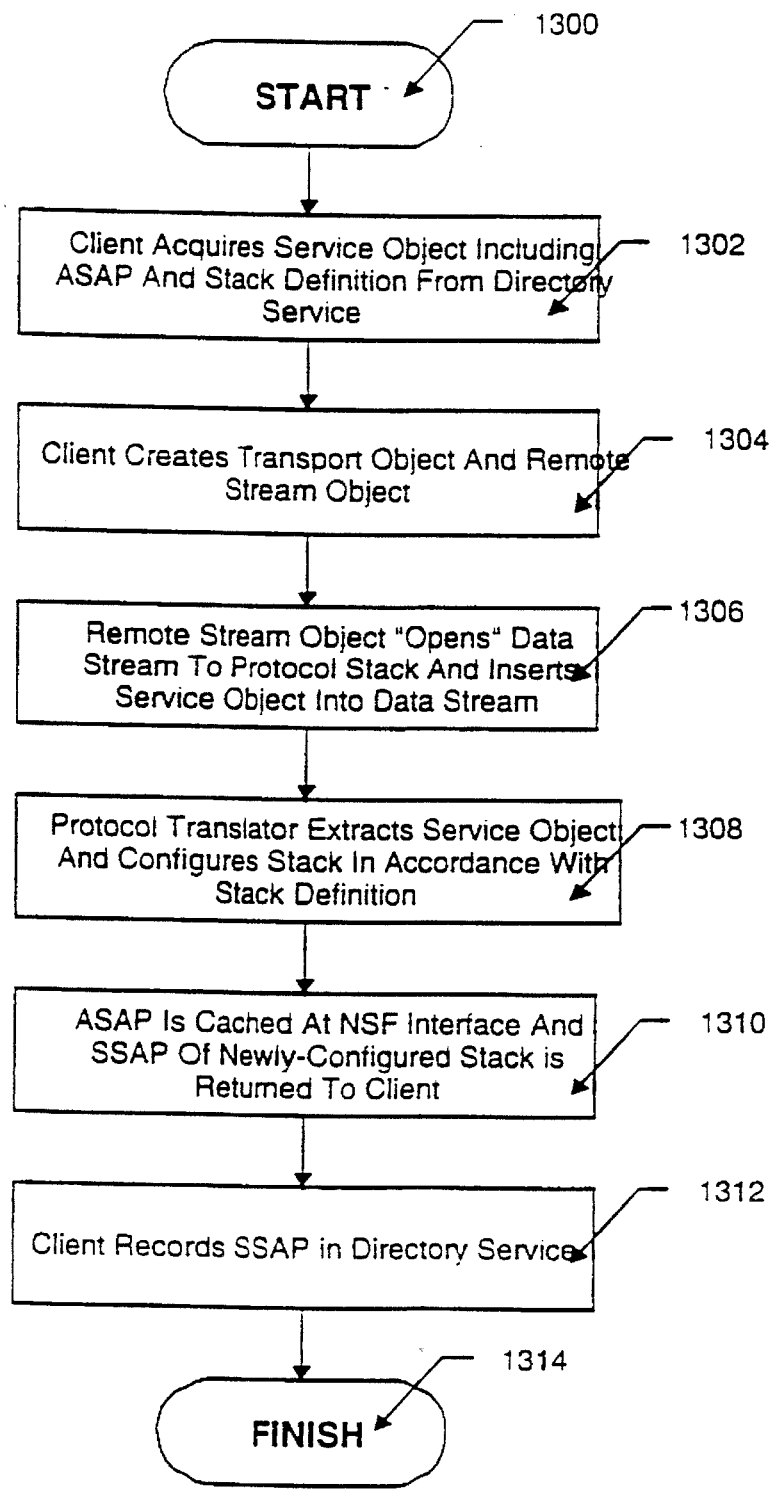
FIG. 13 is an illustrative flow-chart of the sequence of steps involved in configuring the data path of a client node prior to invoking an RPC service request.

FIG. 13 is an illustrative flow-chart of the sequence of steps involved in configuring the data path of a client node prior to invoking an RPC service request. The sequence starts in step 1300 and proceeds to step 1302 where a client application, desiring a particular service, acquires a service object from a directory service. The service object typically comprises two parts: a reference to a stack definition and an address for the remote service. The stack definition is itself an object that is passed from the client application to the NSF interface to instantiate the dynamically-configurable protocol stack. The address for the remote service is the application service access point (ASAP) of the remote protocol stack.

Next, in step 1304, the client application creates a transport object and a remote stream object. Specifically, the transport object creates the remote stream object which, in turn, "passes" the service object as an argument. That is, in step 1306, the remote stream object "opens" a data stream, which extends to the session layer of a protocol stack of the NSF interface, and inserts the service object onto that stream.

Because, in this instance, client-server communication refers to communication between that node's application program and NSF interface, the "client" is the application 1214 (FIG. 12) and the receiver of the transport object is a protocol translator residing in the session layer of a dynamically-configurable protocol stack in the System address space, i.e. the "server".

In step 1308, the protocol translator extracts the service object from the data stream and, using the stack definition, configures the protocol stack for communication with the remote service. The protocol translator then, in step 1310 stores, i.e., caches, the ASAP remote address in a buffer and returns a session service access point (SSAP) address of the newly-configured protocol stack to the client application over the data stream. At step 1312, the client application then records the SSAP address in the service directory, thus completing the data path configuration sequence in step 1314.

RPC Service Request

Figure 14:
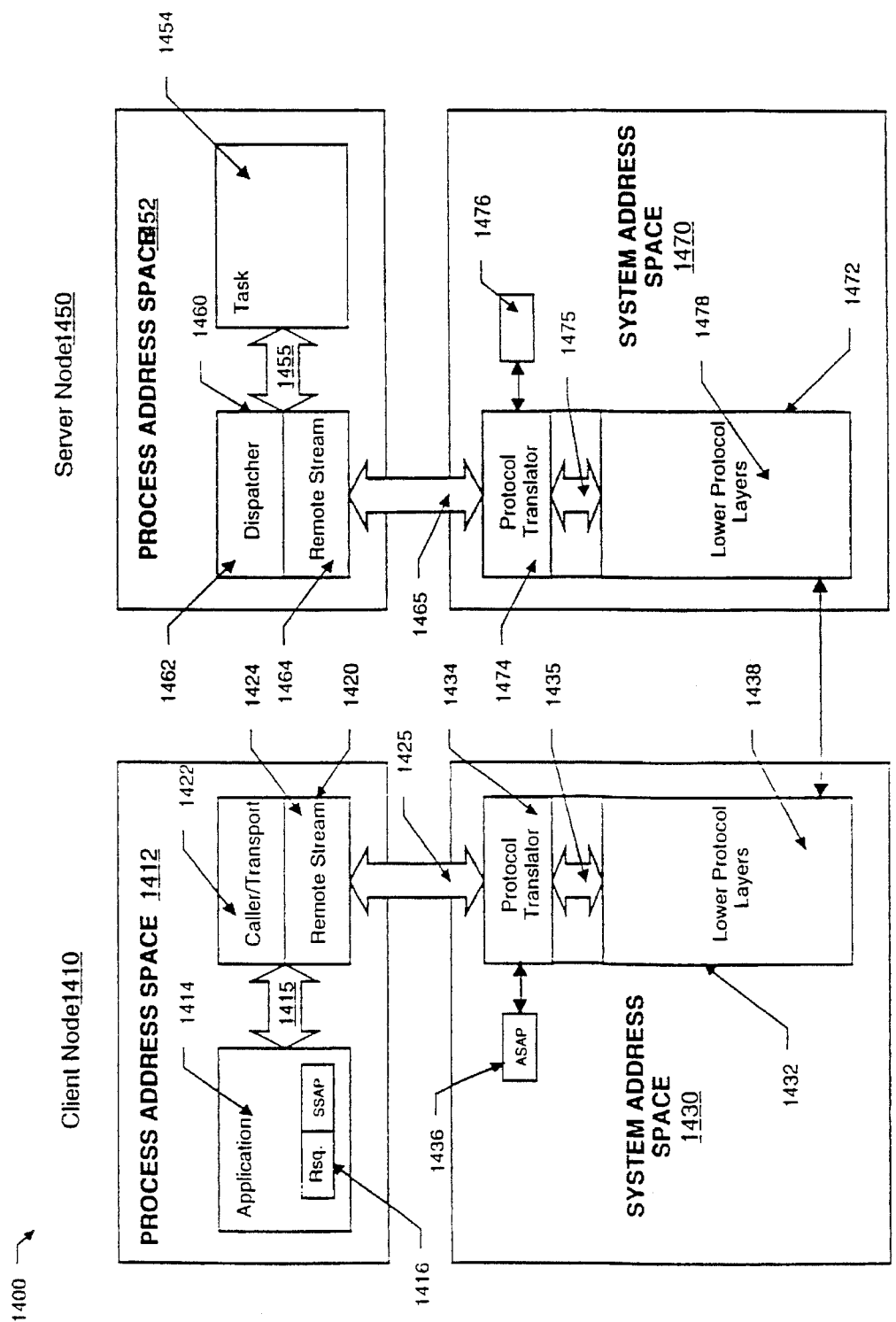
FIG. 14 is a schematic block diagram of client and server nodes in which the object-oriented CSF interfaces and NSF interfaces are utilized to invoke, and respond to, an RPC service request.

FIG. 14 is a schematic block diagram of client-server system 1400 including a client node 1410 and a server node 1450 in which the object-oriented CSF interfaces and NSF interfaces are utilized to invoke, and respond to, an RPC service request. An application 1414 executes on the client node 1410 and generates request 1416, including an SSAP address of the proper protocol stack. However, for this embodiment of the invention, application 1414 interacts with the CSF interface 1420 through caller/transport objects 1422 and a remote stream object 1424, each of which resides in process address space 1.412. Communication between the application 1414 and the CSF interface 1420 is shown schematically by arrow 1415.

In system address space 1430, a protocol translator object 1.434 operates in the session layer of a dynamically-configurable protocol stack 1432. Interaction between the protocol translator object and the remote stream object 1424 is indicated by arrow 1425. In addition, interaction between the protocol translator object 1434 and the lower layers of the protocol stack 1438 is indicated by arrow 1435. Moreover, the protocol translator object 1234 interacts with a buffer 1436 to store and retrieve address information.

At the server node 1450, a task application 1454 interacts with the CSF interface 1460 through a dispatcher object 1462 and a remote stream object 1464, each of which resides in process address space 1452. Communication between the task application 1454 and the CSF interface 1460 is shown schematically by arrow 1455. As with the client node 1410, a protocol translator object 1474 operates in the session layer of a dynamically-configurable protocol stack 1472 located in system address space 1470. Interaction between the protocol translator object and the remote stream object 1464 is indicated by arrow 1465, while interaction between the protocol translator object 1474 and the lower layers of the protocol stack 1478 is indicated by arrow 1435. Lastly, the protocol translator object 1274 interacts with a buffer 1476 to store and retrieve address information.

Figure 15A:
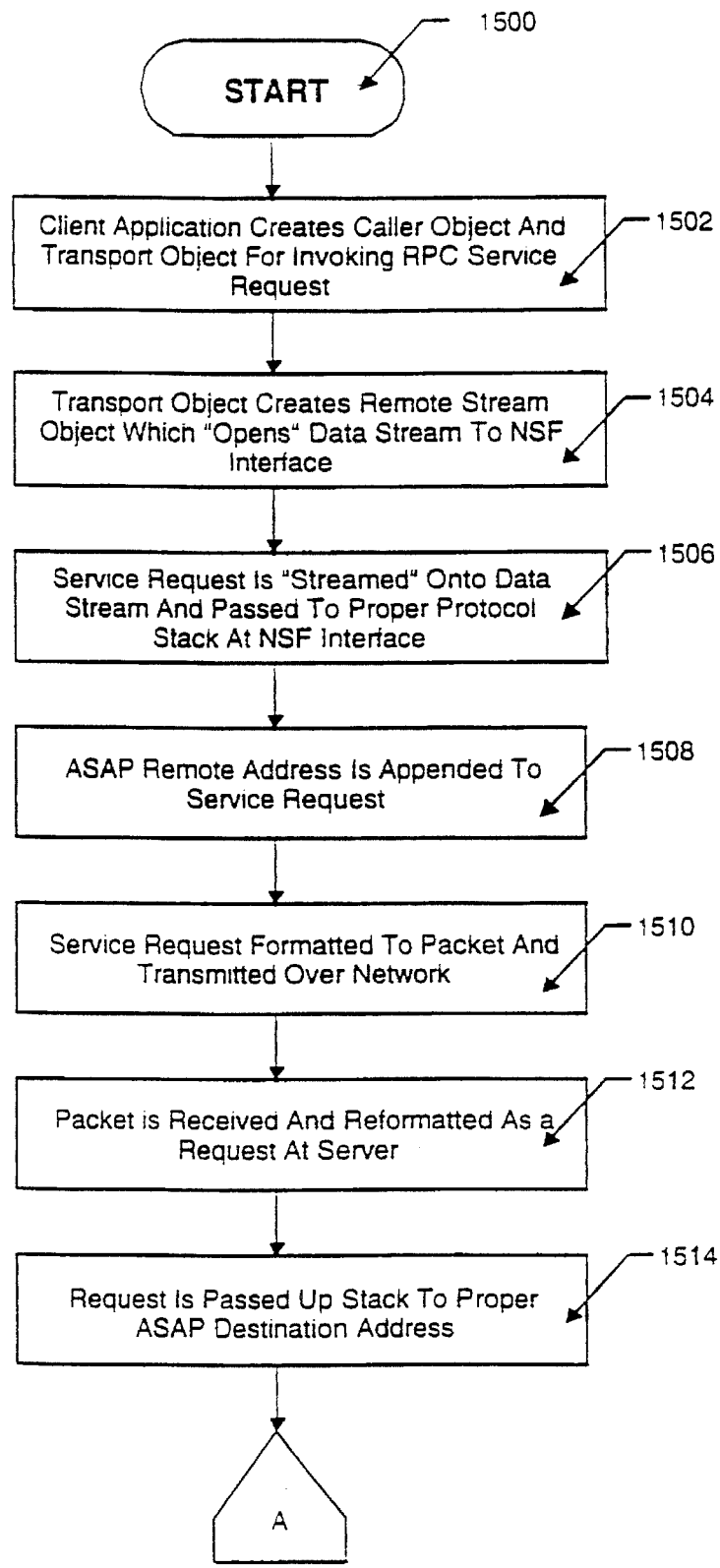
FIGS. 15A and 15B are an illustrative flow-chart of the sequence of steps involved in invoking, and responding to, an RPC service request at client and server nodes.
Figure 15B:
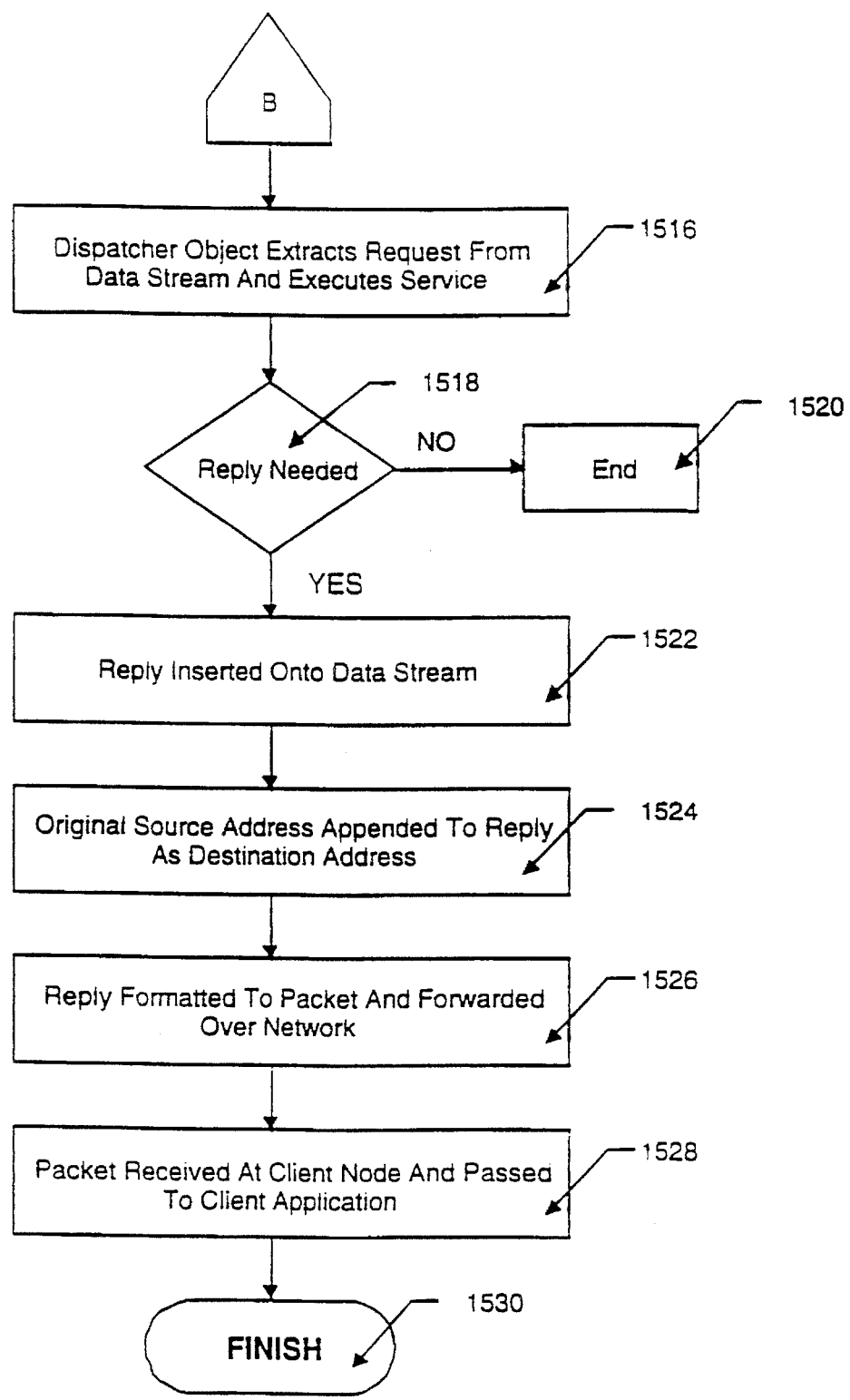

FIG. 15 is an illustrative flow-chart of the sequence of steps involved in invoking, and responding to, an RPC service request at client and server nodes. The sequence starts in step 1500 and proceeds to step 1502 where a client application, desiring to access a service, issues a request that is formatted by creating a caller object and a transport object. In step 1504, the transport object creates a remote stream object which "opens" a data stream to the NSF interface. Since the data path has been previously configured, client-server communication involves transferring the service request from the application 1414 (FIG. 14), i.e., the "client", to a task application 1454 of the remote server node, i.e., the "server".

The service request, including the SSAP of the proper protocol stack, is then "streamed" onto the data stream and received by the protocol translator, which passes it to the session layer address of the proper protocol stack (step 1506). The protocol translator is capable of delivering the request to the correct peer session on the remote node. Specifically, the protocol translator obtains the cached ASAP remote address from the buffer (step 1508) and appends it to the service request as a destination address. At step 1510, the service request formatted for transmission as a packet and passed down the protocol stack to a network communications channel.

At the server node, the request packet is reformatted at the protocol stack, including stripping the source address from the packet and caching that address (step 1512). At step 1514, the request is passed up the stack to the proper ASAP destination address. Specifically, when the request arrives at the server's session layer, it is examined and the ASAP, which uniquely identifies the layer providing the specific service, is extracted. A data stream is then created by a pre-defined remote stream object so that a pre-defined dispatcher object, and its associated methods, may extract the remote request from the data stream and pass it to the appropriate task for execution of the service (step 1516). Often, execution of the service may be provided by a sub-object associated with a particular resource at the server. It should be noted that, for a long-term PROSE transport transaction, the server and transport data stream are bound to the ASAP until the server responds.

If no reply is necessary (step 1518), the sequence ends at step 1520. If a reply is required, it is returned by the dispatcher by inserting the reply onto the data stream at step 1522. The reply is passed down the protocol stack and the (previous) source address is appended to the reply as a destination address (step 1524). At step 1526, the reply is then formatted for retransmission as a packet and forwarded onto the network. At step 1528, the packet is received by the client node and passes up the appropriate stack to the client application. The RPC service request: is thus completed at step 1530. It should also be noted that, for the long-term association, when the reply is returned to the requesting client, it is sent back over the bound path, thus requiring no addressing information.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

Having thus described our invention, what we claim as new, and desire to secure by letters patents is:

1. A system for implementing remote procedure call services over a computer network having a plurality of alternate communication links, each of the plurality of alternate communication links having a different network protocol, the system comprising:

(a) a client node having a source network address:
   (b) a server node having a task application program executing therein to provide services;
   (c) a memory in the client node with a system address space and a process address space having an application program executing therein for generating a service request;
   (d) a first dynamically-configurable protocol stack in the system address space configurable for connecting the client node to one of the plurality of alternate communication links by packaging data according to the network protocol of the one communication link:
   (e) means responsive to the service request for providing a service object to the application program, the service object containing information for configuring the first dynamically-configurable protocol stack and destination network address of the task application program;
   (f) means responsive to the service request for instantiating an API object in the client node, which API object establishes a stream extending from the application program in the process address space to the first dynamically-configurable protocol stack in system address space and inserts the service object into the data stream to configure the first dynamically-configurable protocol stack;
   (g) means responsive to the configuration of the dynamically-configurable protocol stack for instantiating a first RPC object in the client node which creates a service request packet containing the service request, the source network address and the destination network address;
   (h) a second dynamically-configurable protocol stack in the server node configured to connect the server node to the one alternate communication link by unpackaging data according to the network protocol of the one communication link: and
   (i) interface means in the server node for receiving the service request packet and providing the service request packet to the task application program.

2. A system as recited in claim 1 further comprising:

(j) a transport object instantiated in the process address space of the memory by the application program, the transport object selecting a transport mechanism to forward the service object from the application program to the first dynamically-configurable protocol stack; and
   (k) a protocol translator object instantiated in the system address space, the protocol translator object for extracting the service object from the data stream and for configuring the first dynamically-configurable protocol stack to connect the application program to the one communication link.

3. A system as recited in claim 1 wherein the interface means comprises a second API object in the server node for establishing a data path from the second dynamically-configurable protocol stack to the task application program.

4. A system as recited in claim 3 wherein the interface means comprises a second RPC object in the server node for receiving the service request packet and processing the service request.

5. A system as recited in claim 3, wherein the second API object creates a data stream object for establishing synchronous transactions between the task application program and a session layer of the second dynamically-configurable protocol stack.

6. A system as recited in claim 5, wherein the second dynamically-configurable protocol stack includes a plurality of upper protocol layer objects that are unique to the task application program executing in the server node and a plurality of lower protocol layer objects that are shared among other task application programs executing in the server node.

7. A system as recited in claim 1, wherein the first RPC object comprises:

a caller object which creates the service request packet by combining data and functions associated with the service request with the source network address and the destination network address: and wherein the second RPC object comprises:

a dispatcher object for locating subroutines in the task application program invoked by the caller object so as to perform the functions.

8. A system as recited in claim 3, wherein the first dynamically-configurable protocol stack comprises vertically-linked protocol layer objects dynamically-configurable protocol stack residing in the system address space of the memory in the client node.

9. A system as recited in claim 8, wherein one of the protocol layer objects is a network layer object of the first dynamically-configurable protocol stack, the network layer object containing state information relative to a predetermined instantiation of the first dynamically-configurable protocol stack.

10. A system as recited in claim 9, wherein the state information includes a network service access point address of the first dynamically-configurable protocol stack.

11. A system as recited in claim 10, wherein the first dynamically configurable protocol stack includes a data link layer object for formatting the service request packet, the data link object operating in connection with an interrupt service routine to move the service request packet to and from the one communication link.

12. A system as recited in claim 11, wherein the first dynamically-configurable protocol stack includes a capsulator layer object for encapsulating the service request packet, the capsulator layer having header information relating to the data link object, the header information comprising a data link service access point address of the first dynamically-configurable protocol stack and a destination address of the service request packet.

13. A system as recited in claim 12, wherein the first dynamically-configurable protocol stack includes a family layer object which contains muting information used to dispatch to the data link layer object, the routing information including the capsulator layer object.

14. A client node for use in a client-server system having a network with a plurality of alternate communication links, each of the plurality of alternate communication links using a different network protocol and a server node coupled to the network containing a task application program, the client node having a source network address and comprising:

(a) a memory with a system address space and a process address space having a client application program executing in the process address space for generating a service request;

(b) a dynamically-configurable protocol stack in the system address space configurable for connecting the client node to one of the plurality of alternate communication links by packaging data according to the network protocol of the one communication link;

(c) means responsive to the service request for providing a service object to the application program, the service object containing information for configuring the dynamically-configurable protocol stack and destination network address of the task application program;

(d) means responsive to the service request for instantiating an API object in the client node, which API object establishes a data stream extending from the application program in the process address space to the dynamically-configurable protocol stack in system address space and inserts the service object into the data stream to configure the dynamically-configurable protocol stack;

(e) means responsive to the configuration of the dynamically-configurable protocol stack for instantiating an RPC object in the client node which creates a service request packet containing the service request, the source network address and the destination network address; and (f) means for placing the service request packet on the data stream 15. The client node as recited in claim 14, wherein the dynamically-configurable protocol stack includes a plurality of upper protocol layer objects that are unique to the client application program executing in the client node and a plurality of lower protocol layer objects that are shared among other client application programs executing in the client node.

16. A client node as recited in claim 14 further comprising:

(g) a transport object instantiated in the process address space of the memory by the application program, the transport object selecting a transport mechanism to forward the service object from the application program to the dynamically-configurable protocol stack; and (h) a protocol translator object instantiated in the system address space, the protocol translator object for extracting the service object from the data stream and for configuring the dynamically-configurable protocol stack to connect the application program to the one communication link.

17. The client node as recited in claim 15, wherein at least one of the plurality of upper protocol layers of the dynamically-configurable protocol stack is an application layer object for exchanging service request packet with the client application program.

18. The client node as recited in claim 17, wherein at least one of the upper protocol layers of the dynamically-configurable protocol stack is a presentation layer object for presenting the service request packet in a predetermined format to the lower protocol layer objects.

19. The client node as recited in claim 18, wherein the client application layer and presentation layer objects of the dynamically-configurable protocol stack reside in the process address space of the memory.

20. The client node as recited in claim 19, wherein the RPC object comprises:

a caller object which creates the service request packet by combining data and functions associated with the service request with the source network address and the destination network address.

21. The client node as recited in claim 20, wherein the plurality of lower protocol layer objects of the dynamically configurable protocol stack and the operating system reside in a system address space of the memory.

22. The client node as recited in claim 21, further comprising a remote stream object which ensures a consistent format for the presentation of service request packet between the process address space and the system address space of the memory.

23. The client node as recited in claim 22, wherein the remote stream object comprises:

one of a request model object and a reply model object for establishing short-term synchronous transactions between the client and server nodes; and a partial remote operation service element model object for binding the client and server nodes over long-term synchronous transactions.

24. A server node for use in a client-server system having a network with a plurality of alternate communication links, each of the plurality of alternate communication links having a different network protocol and a client node coupled to the network, the server node comprising:

(a) a memory having a system address space and it process address space having a task application program stored therein, the task application program being responsive to a service request packet from the client node for providing services to the client node;

(b) a dynamically-configurable protocol stack configured to connect the server node to the one alternate communication link by unpackaging data according to the network protocol of the one communication link;

(c) an RPC object in the server node for receiving the service request packet and processing the service request to locate and invoke the task application program;

(d) an API object in the server node for establishing a data path from the dynamically-configurable protocol stack to the RPC object; and (e) means responsive to a creation of the task application program for instantiating a service object containing information for configuring a dynamically-configurable protocol stack in the client node and a destination network address of the task application program 25. The server node as recited in claim 24, wherein the dynamically configurable protocol stack includes a plurality of upper protocol layer objects that are unique to the task application program executing in the server node and a plurality of lower protocol layer objects that are shared among other task application programs executing in the server node.

26. The server node as recited in claim 25, wherein at least one of the plurality of upper protocol layers of the dynamically configurable protocol stack is an application layer object for exchanging the service request packet with the task application program.

27. The sewer node as recited in claim 26, wherein at least one of the upper protocol layers of the dynamically configurable protocol stack is a presentation layer object for presenting the service request packet in a predetermined format to the lower protocol layer objects of the dynamically configurable protocol stack.

28. The server node as recited in claim 27, wherein the application layer object and presentation layer object of the dynamically configurable protocol stack reside in the process address space of the memory.

29. The server node as recited in claim 28 wherein the dispatcher object and the task application program further reside in the process address space.

30. The server node as recited in claim 29, wherein the lower protocol layer objects of the dynamically configurable protocol stack and the operating system reside in the system address space of the memory.

31. The server node as recited in claim 20, further comprising a remote stream object which ensures a consistent format for the presentation of the service request packet between the process address space and the system address space of the memory.

32. The server node as recited in claim 31, wherein the remote stream object comprises one of a request model object and a reply model object for establishing short-term synchronous transactions between the server node and client node.

33. A method for configuring a data path within a node of a client-server system prior to invoking remote procedure call communication over a network having a plurality of alternate communication links, each of the alternate communication links using a different network protocol, the node including a processor and a memory, the memory having an operating system and an application program stored therein, the operating system and application program for controlling the operations of the processor, the operating system including a dynamically-configurable protocol stack, the method comprising the steps of:

(a) acquiring, in the application program, a service object from a directory service of the node, the service object including a remote service address and configuration data for one of the plurality of alternate communication links;

(b) creating a remote stream object for opening a data stream between the application program and the dynamically-configurable protocol stack;

(c) inserting the service object onto the data stream at the application program as an argument of the remote stream object;

(d) extracting the service object from the data stream at the dynamically-configurable protocol stack; and (e) configuring the protocol stack in accordance with the configuration data in the service object to connect the application program to one of the plurality of alternate communication links using a network protocol appropriate for the one alternate communication link.

34. The method as recited in claim 33, including the step of creating a transport object for selecting a transport mechanism with which to forward the service object from the application program to the dynamically-configurable protocol stack.

35. The method as recited in claim 33, including the step of storing the remote service address in a buffer.

36. The method as recited in claim 35, including the step of returning an access point address of a newly-configured protocol stack to the application program.

37. The method as recited in claim 36, including the step of recording the access point address in the directory service.

38. A method for invoking, and responding to, a remote procedure call service request at client and sewer nodes of a computer network, the client and server nodes coupled to a communications network having a plurality of alternate communication links each of the plurality of alternate communication links using a different network protocol, each of the client and server nodes including a processor and a memory, the memory having an operating system and an application program stored therein for controlling the operations of the processor, each of the operating systems including a dynamically-configured protocol stack, the method comprising the steps of:

(a) issuing a service request at a client application of the client node, the service request including an access point address of a client dynamically-configured protocol stack;

(b) creating a caller object to invoke a remote procedure call protocol in response to the service request;

(c) creating a first remote stream object for opening a first data stream between the client application and the client dynamically-configured protocol stack;

(d) inserting the service request onto the first data stream at the client application;

(e) appending a remote address to the service request at the client dynamically-configured protocol stack and transmitting the service request over the communications network to the sewer node;

(f) opening a second data stream from a second remote stream object, the second data stream passing the service request between a server dynamically-configured protocol stack and a server application of the sewer node; and (g) extracting the service request from the second data stream using a dispatcher object and passing the service request to the server application in accordance with the remote address for execution of the service request.

39. The method as recited in claim 38, including the step of creating a transport object at the client application for selecting a transport mechanism with which to forward the service object from tile client application to the client protocol stack.

40. The method as recited in claim 39, including the step of:

(h) receiving the service request at a protocol translator object of the client protocol stack in accordance with the access point address, the access point address functioning as a source address of the service request.

41. The method as recited in claim 40, wherein the step of appending the remote address further comprises the step of obtaining the remote address from a first buffer, the remote address functioning as a destination address of the service request.

42. The method as recited in claim 41, wherein the step of appending the remote address further comprises the step of formatting, at the client dynamically-configurable protocol stack, the service request as a first packet prior to transmitting the service request over the communications network.

43. The method as recited in claim 42, including the steps of:

(i) receiving the first packet at the server node;

(j) stripping the source address from the first packet; storing the source address in a second buffer; and (k) reformatting the first packet as the service request at the server dynamically-configured protocol stack.

44. The method as recited in claim 43, including the step of passing the request up the server protocol stack to the destination address.

45. The method as recited in claim 44 wherein in response to the execution of the service request requiring a reply, the method further comprises the steps of:

(l) inserting the reply onto the second data stream;

(m) passing the reply down the server dynamically-configurable protocol stack;

(n) obtaining the source address from the second buffer;

(o) appending the source address to the reply as a reply destination address;
(p) formatting the reply as a second packet; and
(q) transmitting the second packet over the network to the client node.

46. The method as recited in claim 45, including the steps of:

(r) receiving the second packet at the client node;
(s) reformatting the second packet as the reply; and
(t) passing the reply up the client dynamically-configurable protocol stack to the client application in accordance with the reply destination address.

* * * * *